(12) United States Patent
Raghavan et al.

(10) Patent No.: US 6,634,981 B1
(45) Date of Patent: Oct. 21, 2003

(54) FAMILY OF TRANSMISSION MECHANISMS WITH THREE PLANETARY GEAR SETS AND A STATIONARY MEMBER

(75) Inventors: Madhusudan Raghavan, West Bloomfield, MI (US); Norman Kenneth Bucknor, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/123,667

(22) Filed: Apr. 16, 2002

(51) Int. Cl.⁷ ................................................. F16H 3/62
(52) U.S. Cl. ...................... 475/275; 475/286; 475/278
(58) Field of Search .................. 475/275, 276, 475/278, 282, 286

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,425,841 B1 * | 7/2002 | Haka | 475/275 |

* cited by examiner

Primary Examiner—Dirk Wright

(57) ABSTRACT

The family of transmissions has a plurality of members that can be utilized in powertrains to provide at least seven forward speed ratios and one reverse speed ratio. The transmission family members include three planetary gear sets having six torque-transmitting mechanisms and one fixed interconnection. Also, one planetary gear member is continuously connected with the transmission housing. The powertrain includes an engine and torque converter that is continuously connected to one of the planetary gear members and an output member that is continuously connected with another one of the planetary gear members. The six torque-transmitting mechanisms provide interconnections between various gear members and with the transmission housing, and are operated in combinations of three to establish at least seven forward speed ratios and one reverse speed ratio.

15 Claims, 20 Drawing Sheets

| | RATIOS | 50 | 52 | 54 | 56 | 58 | 59 |
|---|---|---|---|---|---|---|---|
| REVERSE | -3.74 | X | X | | | | X |
| NEUTRAL | 0 | | X | | | | X |
| 1 | 4.23 | | X | X | | | X |
| 2 | 2.66 | | X | X | | X | |
| 3 | 1.87 | X | X | X | | | |
| 4 | 1.26 | | X | X | X | | |
| 5 | 1 | X | | X | X | | |
| 6 | 0.81 | X | X | | X | | |
| 7 | 0.67 | | X | | X | X | |

(X = ENGAGED CLUTCH)

$\dfrac{\text{RING GEAR}}{\text{SUN GEAR}}$ TOOTH RATIO: $\dfrac{R_1}{S_1} = 2.00$, $\dfrac{R_2}{S_2} = 2.98$, $\dfrac{R_3}{S_3} = 2.42$

| RATIO SPREAD | 6.35 |
|---|---|
| RATIO STEPS | |
| REV/1 | -0.88 |
| 1/2 | 1.59 |
| 2/3 | 1.42 |
| 3/4 | 1.49 |
| 4/5 | 1.26 |
| 5/6 | 1.23 |
| 6/7 | 1.22 |

| | RATIOS | 150 | 152 | 154 | 156 | 158 | 159 |
|---|---|---|---|---|---|---|---|
| REVERSE | -4.22 | X | | X | | | X |
| NEUTRAL | 0 | | | X | | | X |
| 1 | 5.33 | | | X | X | | X |
| 2 | 3.5 | | | X | | X | X |
| 3 | 2.17 | | | X | X | X | |
| 4 | 1.5 | X | | X | | X | |
| 5 | 1 | | X | X | | X | |
| 6 | 0.77 | | X | X | X | | |
| 7 | 0.68 | X | X | X | | | |
| 8 | 0.53 | | X | | | X | X |

(X = ENGAGED CLUTCH)

$\frac{\text{RING GEAR}}{\text{SUN GEAR}}$ TOOTH RATIO: $\frac{R_1}{S_1} = 2.50$, $\frac{R_2}{S_2} = 2.25$, $\frac{R_3}{S_3} = 1.55$

| RATIO SPREAD | 10.06 |
|---|---|
| RATIO STEPS | |
| REV/1 | -0.79 |
| 1/2 | 1.52 |
| 2/3 | 1.61 |
| 3/4 | 1.44 |
| 4/5 | 1.5 |
| 5/6 | 1.3 |
| 6/7 | 1.12 |
| 7/8 | 1.28 |

|  | RATIOS | 250 | 252 | 254 | 256 | 258 | 259 |
|---|---|---|---|---|---|---|---|
| REVERSE | -2.25 | X | X |  | X |  |  |
| NEUTRAL | 0 | X |  |  | X |  |  |
| 1 | 5.61 | X |  |  | X |  | X |
| 2 | 3.35 | X |  | X |  |  | X |
| 3 | 2.38 | X |  | X | X |  |  |
| 4 | 1.67 | X |  | X |  | X |  |
| 5 | 1 | X | X | X |  |  |  |
| 6 | 0.71 |  | X | X |  | X |  |
| 7 | 0.63 |  | X | X | X |  |  |

(X = ENGAGED CLUTCH)

$\dfrac{\text{RING GEAR}}{\text{SUN GEAR}}$ TOOTH RATIO: $\dfrac{R_1}{S_1} = 2.33$, $\dfrac{R_2}{S_2} = 2.50$, $\dfrac{R_3}{S_3} = 2.25$

| RATIO SPREAD | 8.86 |
|---|---|
| RATIO STEPS |  |
| REV/1 | -0.4 |
| 1/2 | 1.68 |
| 2/3 | 1.4 |
| 3/4 | 1.42 |
| 4/5 | 1.67 |
| 5/6 | 1.4 |
| 6/7 | 1.13 |

| RATIOS | | 350 | 352 | 354 | 356 | 358 | 359 |
|---|---|---|---|---|---|---|---|
| REVERSE | -2.9 | X | X | | | X | |
| NEUTRAL | 0 | X | | | | X | |
| 1 | 5.22 | X | | X | | X | |
| 2 | 3.48 | | | X | | X | X |
| 3 | 2.17 | | X | X | | X | |
| 4 | 1.67 | | X | X | | | X |
| 5 | 1 | | X | X | X | | |
| 6 | 0.67 | | X | | X | | X |
| 7 | 0.6 | | X | | X | X | |

(X = ENGAGED CLUTCH)

$\frac{\text{RING GEAR}}{\text{SUN GEAR}}$ TOOTH RATIO: $\frac{R_1}{S_1} = 2.00$, $\frac{R_2}{S_2} = 1.50$, $\frac{R_3}{S_3} = 1.80$

| RATIO SPREAD | 8.72 |
|---|---|
| RATIO STEPS | |
| REV/1 | -0.56 |
| 1/2 | 1.5 |
| 2/3 | 1.6 |
| 3/4 | 1.30 |
| 4/5 | 1.67 |
| 5/6 | 1.5 |
| 6/7 | 1.11 |

| | RATIOS | 450 | 452 | 454 | 456 | 458 | 459 |
|---|---|---|---|---|---|---|---|
| REVERSE | -3.75 | X | X | | | | X |
| NEUTRAL | 0 | X | | | | | X |
| 1 | 3.54 | X | | X | | | X |
| 2 | 2.01 | X | | X | | X | |
| 3 | 1.43 | X | X | X | | | |
| 4 | 1 | X | | X | X | | |
| 5 | 0.83 | | X | X | X | | |
| 6 | 0.72 | X | X | | X | | X |
| 7 | 0.6 | | X | | X | X | |

(X = ENGAGED CLUTCH)

$\dfrac{\text{RING GEAR}}{\text{SUN GEAR}}$ TOOTH RATIO: $\dfrac{R_1}{S_1} = 1.51$, $\dfrac{R_2}{S_2} = 2.33$, $\dfrac{R_3}{S_3} = 2.26$

| RATIO SPREAD | 5.89 |
|---|---|
| RATIO STEPS | |
| REV/1 | -1.06 |
| 1/2 | 1.76 |
| 2/3 | 1.41 |
| 3/4 | 1.43 |
| 4/5 | 1.2 |
| 5/6 | 1.16 |
| 6/7 | 1.19 |

| | RATIOS | 550 | 552 | 554 | 556 | 558 | 559 |
|---|---|---|---|---|---|---|---|
| REVERSE | -2.61 | | | X | | X | X |
| NEUTRAL | 0 | | X | | | | X |
| 1 | 3.25 | | X | | X | | X |
| 2 | 1.9 | | X | X | | | X |
| 3 | 1.3 | X | | X | | | X |
| 4 | 1 | X | | | X | X | |
| 5 | 0.74 | X | | X | | X | |
| 6 | 0.49 | X | | | X | X | |
| 7 | 0.4 | | X | | X | X | |

(X = ENGAGED CLUTCH)

$\frac{\text{RING GEAR}}{\text{SUN GEAR}}$ TOOTH RATIO: $\frac{R_1}{S_1} = 2.24$, $\frac{R_2}{S_2} = 1.49$, $\frac{R_3}{S_3} = 1.50$

| RATIO SPREAD | 8.13 |
|---|---|
| RATIO STEPS | |
| REV/1 | -0.8 |
| 1/2 | 1.71 |
| 2/3 | 1.46 |
| 3/4 | 1.30 |
| 4/5 | 1.35 |
| 5/6 | 1.51 |
| 6/7 | 1.23 |

| RATIOS | | 650 | 652 | 654 | 656 | 658 | 659 |
|---|---|---|---|---|---|---|---|
| REVERSE | -1.56 | X | | | X | | X |
| NEUTRAL | 0 | | X | | X | | |
| 1 | 3.25 | | X | | X | X | |
| 2 | 1.69 | X | X | | X | | |
| 3 | 1 | X | | X | X | | |
| 4 | 0.62 | X | X | X | | | |
| 5 | 0.49 | | X | X | | X | |
| 6 | 0.4 | | X | X | | | X |
| 7 | 0.29 | X | | X | | | X |

(X = ENGAGED CLUTCH)

$\frac{\text{RING GEAR}}{\text{SUN GEAR}}$ TOOTH RATIO: $\frac{R_1}{S_1} = 2.25$, $\frac{R_2}{S_2} = 1.49$, $\frac{R_3}{S_3} = 2.26$

| RATIO SPREAD | 11.23 |
|---|---|
| RATIO STEPS | |
| REV/1 | -0.48 |
| 1/2 | 1.92 |
| 2/3 | 1.69 |
| 3/4 | 1.61 |
| 4/5 | 1.26 |
| 5/6 | 1.23 |
| 6/7 | 1.38 |

| RATIOS | | 750 | 752 | 754 | 756 | 758 | 759 |
|---|---|---|---|---|---|---|---|
| REVERSE | -2 | X | | | X | | X |
| NEUTRAL | 0 | X | | | X | | |
| 1 | 2.5 | X | | | X | X | |
| 2 | 1.5 | | X | | X | X | |
| 3 | 1 | | | X | X | X | |
| 4 | 0.67 | | X | X | | X | |
| 5 | 0.52 | X | | X | | X | |
| 6 | 0.4 | | | X | | X | X |
| 7 | 0.31 | X | | X | | | X |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 2.01$, $\frac{R_3}{S_3} = 1.50$

| RATIO SPREAD | 8.14 |
|---|---|
| RATIO STEPS | |
| REV/1 | -0.8 |
| 1/2 | 1.67 |
| 2/3 | 1.5 |
| 3/4 | 1.50 |
| 4/5 | 1.27 |
| 5/6 | 1.32 |
| 6/7 | 1.3 |

| | RATIOS | 850 | 852 | 854 | 856 | 858 | 859 |
|---|---|---|---|---|---|---|---|
| REVERSE | -2.04 | | X | | X | X | |
| NEUTRAL | 0 | | X | | X | | |
| 1 | 3.6 | X | X | | X | | |
| 2 | 2.26 | X | X | | | | X |
| 3 | 1.5 | X | X | | | X | |
| 4 | 1 | X | X | X | | | |
| 5 | 0.6 | X | | | X | X | |
| 6 | 0.47 | X | | | X | | X |
| 7 | 0.41 | X | | X | X | | |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 1.50$, $\frac{R_3}{S_3} = 2.91$

| RATIO SPREAD | 8.78 |
|---|---|
| RATIO STEPS | |
| REV/1 | -0.56 |
| 1/2 | 1.59 |
| 2/3 | 1.5 |
| 3/4 | 1.50 |
| 4/5 | 1.67 |
| 5/6 | 1.26 |
| 6/7 | 1.15 |

| | RATIOS | 950 | 952 | 954 | 956 | 958 | 959 |
|---|---|---|---|---|---|---|---|
| REVERSE | -1.4 | X | | | X | | X |
| NEUTRAL | 0 | X | | | X | | |
| 1 | 3.5 | X | | | X | X | |
| 2 | 1.89 | | X | | X | X | |
| 3 | 1.34 | X | X | | X | | |
| 4 | 1 | X | X | | | X | |
| 5 | 0.72 | X | | X | | X | |
| 6 | 0.64 | | | X | | X | X |
| 7 | 0.52 | X | | X | | | X |

(X = ENGAGED CLUTCH)

$\dfrac{\text{RING GEAR}}{\text{SUN GEAR}}$ TOOTH RATIO: $\dfrac{R_1}{S_1} = 1.82$, $\dfrac{R_2}{S_2} = 2.50$, $\dfrac{R_3}{S_3} = 2.50$

| RATIO SPREAD | 6.8 |
|---|---|
| RATIO STEPS | |
| REV 1/1 | -0.4 |
| 1/2 | 1.86 |
| 2/3 | 1.41 |
| 3/4 | 1.34 |
| 4/5 | 1.39 |
| 5/6 | 1.11 |
| 6/7 | 1.25 |

| | RATIOS | 1050 | 1052 | 1054 | 1056 | 1058 | 1059 |
|---|---|---|---|---|---|---|---|
| REVERSE | -2.09 | | X | | X | X | |
| NEUTRAL | 0 | | X | | X | | |
| 1 | 5.22 | X | X | | X | | |
| 2 | 2.69 | X | X | | | | X |
| 3 | 1.67 | X | X | | | X | |
| 4 | 1 | X | X | X | | | |
| 5 | 0.6 | X | | | X | X | |
| 6 | 0.49 | X | | | X | | X |
| 7 | 0.43 | X | | X | X | | |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 1.79$, $\frac{R_3}{S_3} = 2.50$

| RATIO SPREAD | 12.19 |
|---|---|
| RATIO STEPS | |
| REV/1 | -0.4 |
| 1/2 | 1.94 |
| 2/3 | 1.6 |
| 3/4 | 1.67 |
| 4/5 | 1.67 |
| 5/6 | 1.22 |
| 6/7 | 1.45 |

|  | RATIOS | 1150 | 1152 | 1154 | 1156 | 1158 | 1159 |
|---|---|---|---|---|---|---|---|
| REVERSE | -1.05 | X |  | X |  | X |  |
| NEUTRAL | 1 | X |  | X |  |  |  |
| 1 | 2.5 | X |  | X | X |  |  |
| 2 | 1.73 |  | X | X | X |  |  |
| 3 | 1 | X | X | X |  |  |  |
| 4 | 0.7 | X | X |  | X |  |  |
| 5 | 0.58 | X | X |  |  |  | X |
| 6 | 0.41 | X | X |  |  | X |  |
| 7 | 0.3 |  | X |  |  | X | X |

(X = ENGAGED CLUTCH)

$\frac{\text{RING GEAR}}{\text{SUN GEAR}}$ TOOTH RATIO: $\frac{R_1}{S_1} = 2.34$, $\frac{R_2}{S_2} = 2.25$, $\frac{R_3}{S_3} = 1.50$

| RATIO SPREAD | 8.38 |
|---|---|
| RATIO STEPS |  |
| REV 1/1 | -0.42 |
| 1/2 | 1.45 |
| 2/3 | 1.73 |
| 3/4 | 1.43 |
| 4/5 | 1.2 |
| 5/6 | 1.4 |
| 6/7 | 1.39 |

| | RATIOS | 1250 | 1252 | 1254 | 1256 | 1258 | 1259 |
|---|---|---|---|---|---|---|---|
| REVERSE | -2.25 | | | | X | X | X |
| NEUTRAL | 0 | | X | | | X | |
| 1 | 2.44 | | X | X | | X | |
| 2 | 1.41 | | X | | X | X | |
| 3 | 1 | X | X | | | X | |
| 4 | 0.66 | X | X | | X | | |
| 5 | 0.48 | X | X | X | | | |
| 6 | 0.36 | X | X | | | | X |
| 7 | 0.3 | X | | | X | | X |
| 8 | 0.28 | X | | X | | | X |

(X = ENGAGED CLUTCH)

$\dfrac{\text{RING GEAR}}{\text{SUN GEAR}}$ TOOTH RATIO: $\dfrac{R_1}{S_1} = 2.50$, $\dfrac{R_2}{S_2} = 1.79$, $\dfrac{R_3}{S_3} = 2.42$

| RATIO SPREAD | 8.06 |
|---|---|
| RATIO STEPS | |
| REV/1 | -1.02 |
| 1/2 | 1.73 |
| 2/3 | 1.41 |
| 3/4 | 1.52 |
| 4/5 | 1.35 |
| 5/6 | 1.36 |
| 6/7 | 1.18 |
| 7/8 | 1.07 |

| | RATIOS | 1350 | 1352 | 1354 | 1356 | 1358 | 1359 |
|---|---|---|---|---|---|---|---|
| REVERSE | -1.12 | | X | | | X | X |
| NEUTRAL | 0 | X | | | | | X |
| 1 | 2.8 | X | | | X | | X |
| 2 | 1.58 | X | | | | X | X |
| 3 | 1 | X | X | | | X | |
| 4 | 0.76 | X | | X | | | X |
| 5 | 0.56 | X | | X | X | | |
| 6 | 0.37 | | | X | X | | X |
| 7 | 0.31 | | | X | | X | X |

(X = ENGAGED CLUTCH)

$\dfrac{\text{RING GEAR}}{\text{SUN GEAR}}$ TOOTH RATIO: $\dfrac{R_1}{S_1} = 1.80$, $\dfrac{R_2}{S_2} = 2.25$, $\dfrac{R_3}{S_3} = 1.92$

| RATIO SPREAD | 9.09 |
|---|---|
| RATIO STEPS | |
| REV/1 | -0.4 |
| 1/2 | 1.77 |
| 2/3 | 1.58 |
| 3/4 | 1.31 |
| 4/5 | 1.35 |
| 5/6 | 1.54 |
| 6/7 | 1.19 |

| | RATIOS | 1450 | 1452 | 1454 | 1456 | 1458 | 1459 |
|---|---|---|---|---|---|---|---|
| REVERSE | -1.84 | | X | | X | | X |
| NEUTRAL | 0 | | X | | X | | |
| 1 | 2.58 | | X | | X | X | |
| 2 | 1.56 | X | | | X | X | |
| 3 | 1 | | | X | X | X | |
| 4 | 0.65 | X | | X | | X | |
| 5 | 0.52 | | X | X | | X | |
| 6 | 0.4 | | | X | X | | X |
| 7 | 0.3 | X | X | | | | X |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 1.84$, $\frac{R_3}{S_3} = 2.80$

| RATIO SPREAD | 8.58 |
|---|---|
| RATIO STEPS | |
| REV/1 | -0.71 |
| 1/2 | 1.66 |
| 2/3 | 1.56 |
| 3/4 | 1.54 |
| 4/5 | 1.25 |
| 5/6 | 1.3 |
| 6/7 | 1.33 |

| | RATIOS | 1550 | 1552 | 1554 | 1556 | 1558 | 1559 |
|---|---|---|---|---|---|---|---|
| REVERSE | -1.87 | X | | X | | | X |
| NEUTRAL | 0 | | | | X | | X |
| 1 | 2.91 | | | | X | X | X |
| 2 | 1.67 | | X | | X | | X |
| 3 | 1 | X | X | | X | | |
| 4 | 0.62 | | X | | X | X | |
| 5 | 0.5 | | | X | X | X | |
| 6 | 0.4 | | X | X | | X | |
| 7 | 0.3 | X | | X | | X | |

(X = ENGAGED CLUTCH)

$\dfrac{\text{RING GEAR}}{\text{SUN GEAR}}$ TOOTH RATIO: $\dfrac{R_1}{S_1} = 1.51$, $\dfrac{R_2}{S_2} = 1.86$, $\dfrac{R_3}{S_3} = 1.50$

| RATIO SPREAD | 9.62 |
|---|---|
| RATIO STEPS | |
| REV/1 | -0.64 |
| 1/2 | 1.75 |
| 2/3 | 1.67 |
| 3/4 | 1.60 |
| 4/5 | 1.24 |
| 5/6 | 1.26 |
| 6/7 | 1.32 |

| RATIOS | | 1650 | 1652 | 1654 | 1656 | 1658 | 1659 |
|---|---|---|---|---|---|---|---|
| REVERSE | -2.96 | | X | | | X | X |
| NEUTRAL | 0 | | | | | X | X |
| 1 | 6.95 | | | X | | X | X |
| 2 | 4.44 | | | | X | X | X |
| 3 | 2.74 | | | X | X | X | |
| 4 | 1.64 | | X | | X | X | |
| 5 | 1.3 | X | | | X | X | |
| 6 | 1.16 | X | X | | X | | |
| 7 | 1 | X | X | | | X | |
| 8 | 0.71 | X | | X | X | | |

(X = ENGAGED CLUTCH)

$\dfrac{\text{RING GEAR}}{\text{SUN GEAR}}$ TOOTH RATIO: $\dfrac{R_1}{S_1} = 1.50$, $\dfrac{R_2}{S_2} = 2.97$, $\dfrac{R_3}{S_3} = 2.42$

| RATIO SPREAD | 6.95 |
|---|---|
| RATIO STEPS | |
| REV/1 | -0.43 |
| 1/2 | 1.56 |
| 2/3 | 1.62 |
| 3/4 | 1.68 |
| 4/5 | 1.26 |
| 5/6 | 1.12 |
| 6/7 | 1.16 |

|  | RATIOS | 1550 | 1552 | 1554 | 1556 | 1558 | 1559 |
|---|---|---|---|---|---|---|---|
| REVERSE 2 | -4.43 |  |  | X | X |  | X |
| REVERSE 1 | -2.51 |  | X |  | X |  | X |
| NEUTRAL | 0 |  | X |  |  |  | X |
| 1 | 6.27 |  | X |  |  | X | X |
| 2 | 4.34 |  |  | X |  | X | X |
| 3 | 2.5 |  | X | X |  | X |  |
| 4 | 1.77 |  |  | X | X | X |  |
| 5 | 1.21 | X |  | X |  | X |  |
| 6 | 1 | X |  |  |  | X | X |
| 7 | 0.85 | X |  | X | X |  |  |
| 8 | 0.71 | X | X | X |  |  |  |

(X = ENGAGED CLUTCH)

$\dfrac{\text{RING GEAR}}{\text{SUN GEAR}}$ TOOTH RATIO: $\dfrac{R_1}{S_1} = 2.50$, $\dfrac{R_2}{S_2} = 2.51$, $\dfrac{R_3}{S_3} = 2.25$

| RATIO SPREAD | 8.83 |
|---|---|
| RATIO STEPS |  |
| REV/1 | -0.4 |
| 1/2 | 1.44 |
| 2/3 | 1.74 |
| 3/4 | 1.42 |
| 4/5 | 1.46 |
| 5/6 | 1.21 |
| 6/7 | 1.17 |
| 7/8 | 1.2 |

| | RATIOS | 1850 | 1852 | 1854 | 1856 | 1858 | 1859 |
|---|---|---|---|---|---|---|---|
| REVERSE | -1.82 | | | | X | X | X |
| NEUTRAL | 0 | | X | | X | | |
| 1 | 3.76 | | X | X | | | X |
| 2 | 2.61 | | X | | X | | X |
| 3 | 1.79 | | X | X | X | | |
| 4 | 1.21 | X | X | | X | | |
| 5 | 1 | X | X | X | | | |
| 6 | 0.71 | X | | X | X | | |
| 7 | 0.6 | X | | X | | | X |
| 8 | 0.56 | X | | | X | | X |
| 9 | 0.41 | | X | X | | X | |

(X = ENGAGED CLUTCH)

$\frac{\text{RING GEAR}}{\text{SUN GEAR}}$ TOOTH RATIO: $\frac{R_1}{S_1} = 1.50$, $\frac{R_2}{S_2} = 2.51$, $\frac{R_3}{S_3} = 2.26$

| RATIO SPREAD | 9.17 |
|---|---|
| RATIO STEPS | |
| REV/1 | -0.48 |
| 1/2 | 1.44 |
| 2/3 | 1.46 |
| 3/4 | 1.47 |
| 4/5 | 1.21 |
| 5/6 | 1.4 |
| 6/7 | 1.19 |
| 7/8 | 1.07 |
| 8/9 | 1.37 |

| | RATIOS | 1950 | 1952 | 1954 | 1956 | 1958 | 1959 |
|---|---|---|---|---|---|---|---|
| REVERSE 2 | -3.89 | | | X | | X | X |
| REVERSE 1 | -2.5 | | | | X | X | X |
| NEUTRAL | 0 | | X | | | | X |
| 1 | 6.25 | | X | X | | | X |
| 2 | 4.02 | | X | | X | | X |
| 3 | 2.5 | | X | X | X | | |
| 4 | 1.56 | | X | | X | X | |
| 5 | 1.29 | X | X | | X | | |
| 6 | 1.16 | X | X | | | X | |
| 7 | 1 | X | X | X | | | |
| 8 | 0.71 | X | | | X | X | |
| 9 | 0.64 | X | | X | | | X |
| 10 | 0.61 | X | | | X | | X |

(X = ENGAGED CLUTCH)

$\dfrac{\text{RING GEAR}}{\text{SUN GEAR}}$ TOOTH RATIO: $\dfrac{R_1}{S_1} = 1.50$, $\dfrac{R_2}{S_2} = 2.50$, $\dfrac{R_3}{S_3} = 2.26$

| RATIO SPREAD | 10.25 |
|---|---|
| RATIO STEPS | |
| REV/1 | -0.4 |
| 1/2 | 1.56 |
| 2/3 | 1.61 |
| 3/4 | 1.61 |
| 4/5 | 1.21 |
| 5/6 | 1.11 |
| 6/7 | 1.16 |
| 7/8 | 1.41 |
| 8/9 | 1.11 |
| 9/10 | 1.05 |

FAMILY OF TRANSMISSION MECHANISMS WITH THREE PLANETARY GEAR SETS AND A STATIONARY MEMBER

BACKGROUND OF THE INVENTION

1. Field of the Invention

The present invention relates to a family of power transmissions having three planetary gear sets that are controlled by six torque-transmitting devices to provide at least seven forward speed ratios and one reverse speed ratio.

2. Background Art

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions, such as Polak, having six or more forward gear ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed input speeds for the remaining two planetary gear sets.

Seven-speed transmissions are disclosed in U.S. Pat. No. 4,709,594 to Maeda; U.S. Pat. No. 6,053,839 to Baldwin et. al.; and U.S. Pat. No. 6,083,135 to Baldwin et. al. Seven- and eight-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

It is an object of the present invention to provide an improved family of transmissions having three planetary gear sets controlled to provide at least seven forward speed ratios and one reverse speed ratio.

In one aspect of the present invention, the family of transmissions has three planetary gear sets, each of which includes a first, second and third member, which members may comprise a sun gear, a ring gear, or a planet carrier assembly member.

In referring to the first, second and third gear sets in this description and in the claims, these sets may be counted "first": to "third" in any order in the drawings (i.e., left to right, right to left, etc.).

In another aspect of the present invention, each of the planetary gear sets may be of the single pinion-type or of the double pinion-type.

In yet another aspect of the present invention, the first member of the first planetary gear set is continuously interconnected to the first member of the second planetary gear set through a first interconnecting member.

In yet another aspect of the present invention, the second member of the first planetary gear set is continuously connected to a transmission housing.

In yet a further aspect of the invention, each family member incorporates an output shaft which is continuously connected with a member of the planetary gear sets and an input shaft which is continuously connected with another member of the planetary gear sets.

In still a further aspect of the invention, a first torque-transmitting mechanism, such as a clutch, selectively interconnects a member of the first planetary gear set with a member of the second or third planetary gear set.

In another aspect of the invention, a second torque-transmitting mechanism, such as a clutch, selectively interconnects a member of the second planetary gear set with a member of the first or third planetary gear set.

In a still further aspect of the invention, a third torque-transmitting mechanism, such as a clutch, selectively interconnects a member of the third planetary gear set with a member of the first or second planetary gear set.

In a still further aspect of the invention, a fourth torque-transmitting mechanism, such as a clutch, selectively interconnects a member of the first or second planetary gear set with another member of the first, second or third planetary gear set.

In a still further aspect of the invention, a fifth torque-transmitting mechanism, such as a clutch, selectively interconnects a member of the second or third planetary gear set with another member of the first, second or third planetary gear set. Alternatively, the fifth torque-transmitting mechanism, such as a brake, selectively interconnects a member of the first, second or third planetary gear set with the transmission housing.

In still another aspect of the invention, a sixth torque-transmitting mechanism, such as a clutch, selectively interconnects a member of the first or third planetary gear set with another member of the first, second or third planetary gear set. Alternatively, the sixth torque transmitting mechanism, such as a brake, selectively connects a member of the first, second or third planetary gear set with the transmission housing.

In still another aspect of the invention, the six torque-transmitting mechanisms are selectively engageable in combinations of three to yield at least seven forward speed ratios and one reverse speed a ratio.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a;

FIG. 12a is a schematic representation of a powertrain having a planetary transmission incorporating another family member of the present invention;

FIG. 12b is a truth table and chart depicting some of the operating characteristics of the powertrain shown in FIG. 12a;

FIG. 13a is a schematic representation of a powertrain having a planetary transmission incorporating another family member of the present invention;

FIG. 13b is a truth table and chart depicting some of the operating characteristics of the powertrain shown in FIG. 13a;

FIG. 14a is a schematic representation of a powertrain having a planetary transmission incorporating another family member of the present invention;

FIG. 14b is a truth table and chart depicting some of the operating characteristics of the powertrain shown in FIG. 14a;

FIG. 15a is a schematic representation of a powertrain having a planetary transmission incorporating another family member of the present invention;

FIG. 15b is a truth table and chart depicting some of the operating characteristics of the powertrain shown in FIG. 15a;

FIG. 16a is a schematic representation of a powertrain having a planetary transmission incorporating another family member of the present invention;

FIG. 16b is a truth table and chart depicting some of the operating characteristics of the powertrain shown in FIG. 16a;

FIG. 17a is a schematic representation of a powertrain having a planetary transmission incorporating another family member of the present invention;

FIG. 17b is a truth table and chart depicting some of the operating characteristics of the powertrain shown in FIG. 17a;

FIG. 18a is a schematic representation of a powertrain having a planetary transmission incorporating another family member of the present invention;

FIG. 18b is a truth table and chart depicting some of the operating characteristics of the powertrain shown in FIG. 18a;

FIG. 19a is a schematic representation of a powertrain having a planetary transmission incorporating another family member of the present invention;

FIG. 19b is a truth table and chart depicting some of the operating characteristics of the powertrain shown in FIG. 19a;

FIG. 20a is a schematic representation of a powertrain having a planetary transmission incorporating another family member of the present invention; and FIG. 20b is a truth table and chart depicting some of the operating characteristics of the powertrain shown in FIG. 20a.

DETAILED DESCRIPTION OF THE PREFERRED EMBODIMENTS

Figures 1A, 1B:
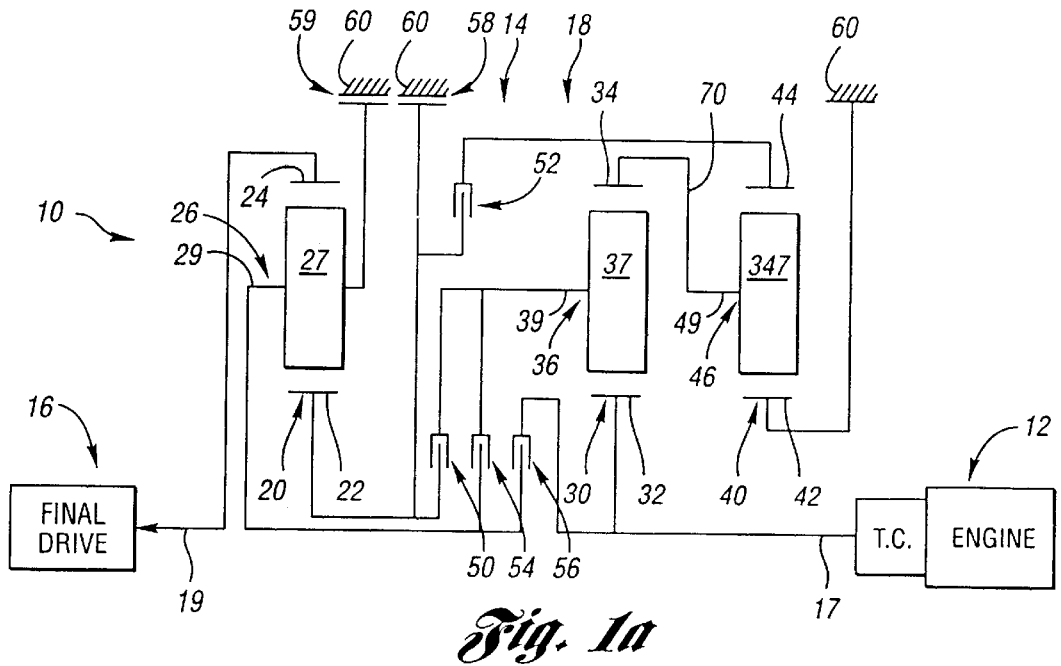

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement also includes six torque-transmitting mechanisms 50, 52, 54, 56, 58 and 59. The torque-transmitting mechanisms 50, 52, 54 and 56 are of the rotating-type torque-transmitting mechanisms, commonly termed clutches. The torque-transmitting mechanisms 58 and 59 are stationary-type torque-transmitting mechanisms, commonly termed brakes or reaction clutches.

The input shaft 17 is continuously connected with the sun gear member 32, and the output shaft 19 is continuously connected with the ring gear member 24. The sun gear member 42 is continuously connected with the transmission housing 60. The ring gear member 34 is continuously connected with the planet carrier assembly member 46 through the interconnecting member 70.

The sun gear member 22 is selectively connectable with the planet carrier assembly member 36 through the clutch 50. The sun gear member 22 is selectively connectable with the ring gear member 44 through the clutch 52. The planet carrier assembly member 26 is selectively connectable with the planet carrier assembly member 36 through the clutch 54. The planet carrier assembly member 26 is selectively connectable with the sun gear member 32 through the clutch 56. The sun gear member 22 is selectively connectable with the transmission housing through the brake 58. The planet carrier assembly member 26 is selectively connectable with the transmission housing 60 through the brake 59.

As shown in FIG. 1b, and in particular the truth table disclosed therein, the torque-transmitting mechanisms are selectively engaged in combinations of three to provide seven forward speed ratios and a reverse speed ratio. It should also be noted in the truth table that the torque-transmitting mechanisms 52 and 59 remain engaged through a neutral condition, thereby simplifying the forward/reverse interchange.

The reverse speed ratio is established with the engagement of the clutches 50, 52 and brake 59. The clutch 50 connects the sun gear member 22 to the planet carrier assembly member 36. The clutch 52 connects the sun gear member 22 to the ring gear member 44. The brake 59 connects the planet carrier assembly member 26 to the transmission housing 60. The sun gear member 22 rotates at the same speed as the planet carrier assembly member 36 and the ring gear member 44. The planet carrier assembly member 26 does not rotate. The ring gear member 24 rotates at the same speed as the output shaft 19. The ring gear member 24, and therefore the output shaft 19, rotates at a speed determined from the speed of the sun gear member 22 and the ring gear/sun gear tooth ratio of the planetary gear set 20. The ring gear member 34 rotates at the same speed as the planet carrier assembly member 46. The sun gear member 32 rotates at the same speed as the input shaft 17. The planet carrier assembly member 36 rotates at a speed determined from the speed of the ring gear member 34, the speed of the sun gear member 32, and the ring gear/sun gear tooth ratio of the planetary gear set 30. The sun gear member 42 does not rotate. The planet carrier assembly member 46 rotates at a speed determined from the speed of the ring gear member 44 and the ring gear/sun gear tooth ratio of the planetary gear set 40. The numerical value of the reverse speed ratio is determined utilizing the ring gear/sun gear tooth ratios of the planetary gear sets 20, 30 and 40.

The first forward speed ratio is established with the engagement of the clutches 52, 54 and the brake 59. The clutch 52 connects the sun gear member 22 to the ring gear member 44. The clutch 54 connects the planet carrier assembly member 26 to the planet carrier assembly member 36. The brake 59 connects the planet carrier assembly member 26 to the transmission housing 60. The planet carrier assembly members 26 and 36 do not rotate. The sun gear member 22 rotates at the same speed as the ring gear member 44. The ring gear member 24 rotates at the same speed as the output shaft 19. The ring gear member 24, and therefore the output shaft 19, rotates at a speed determined from the speed of the sun gear member 22 and the ring gear/sun gear tooth ratio of the planetary gear set 20. The ring gear member 34 rotates at the same speed as the planet carrier assembly member 46. The sun gear member 32 rotates at the same speed as the input shaft 17. The ring gear member 34 rotates at a speed determined from the speed of the sun gear member 32 and the ring gear/sun gear tooth ratio of the planetary gear set 30. The sun gear member 42 does not rotate. The ring gear member 44 rotates at a speed determined from the speed of the planet carrier assembly member 46 and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutches 52, 54 and the brake 58. The clutch 52 connects the sun gear member 22 to the ring gear member 44. The clutch 54 connects the planet carrier assembly member 26 to the planet carrier assembly member 36. The brake 58 connects the sun gear member 22 to the transmission housing 60. The sun gear member 22 and ring gear member 44 do not rotate. The planet carrier assembly member 26 rotates at the same speed as the planet carrier assembly member 36. The ring gear member 24 rotates at the same speed as the output shaft 19. The ring gear member 24, and therefore the output shaft 19, rotates at a speed determined from the speed of the planet carrier assembly member 26 and the ring gear/sun gear tooth ratio of the planetary gear set 20. The ring gear member 34 and planetary gear set 40 do not rotate. The sun gear member 32 rotates at the same speed as the input shaft 17. The planet carrier assembly member 36 rotates at a speed determined from the speed of the sun gear member 32 and the ring gear/sun gear tooth ratio of the planetary gear set 30. The numerical value of the second forward speed ratio is determined utilizing the ring gear/sun gear tooth ratios of the planetary gear sets 20 and 30.

The third forward speed ratio is established with the engagement of the clutches 50, 52, 54. The clutch 50 connects the sun gear member 22 to the planet carrier assembly member 36. The clutch 52 connects the sun gear member 22 to the ring gear member 44. The clutch 54 connects the planet carrier assembly member 26 to the planet carrier assembly member 36. The ring gear member 24 rotates at the same speed as the output shaft 19. The planet carrier assembly member 26 rotates at the same speed as the sun gear member 22, the planet carrier assembly member 36, and the ring gear member 44. The sun gear member 32 rotates at the same speed as the input shaft 17. The ring gear member 34 rotates at the same speed as the planet carrier assembly member 46. The planet carrier assembly member 36 rotates at a speed determined from the speed of the ring gear member 34, the speed of the sun gear member 32, and the ring gear/sun gear tooth ratio of the planetary gear set 30. The sun gear member 42 does not rotate. The planet carrier assembly member 46 rotates at a speed determined from the speed of the ring gear member 44 and the ring gear/sun gear tooth ratio of the planetary gear set 40. The numerical value of the third forward speed ratio is determined utilizing the ring gear/sun gear tooth ratios of the planetary gear sets 30 and 40.

The fourth forward speed ratio is established with the engagement of the clutches 52, 54, 56. The clutch 52 connects the sun gear member 22 to the ring gear member 44. The clutch 54 connects the planet carrier assembly member 26 to the planet carrier assembly member 36. The clutch 56 connects the planet carrier assembly member 26 to the sun gear member 32. The ring gear member 24 rotates at the same speed as the output shaft 19. The planet carrier assembly member 26 rotates at the same speed as the planet carrier assembly member 36, the sun gear member 32, and the input shaft 17. The sun gear member 22 rotates at the same speed as the ring gear member 44. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The ring gear member 34 rotates at the same speed as the planet carrier assembly member 46. The sun gear member 42 does not rotate. The planet carrier assembly member 46 rotates at a speed determined from the speed of the ring gear member 44 and the ring gear/sun gear tooth ratio of the planetary gear set 40. The numerical value of the fourth forward speed ratio is determined utilizing the ring gear/sun gear tooth ratios of the planetary gear sets 20 and 40.

The fifth forward speed ratio is established with the engagement of the clutches 50, 54, 56. In this configuration, the input shaft 17 is directly connected to the output shaft 19. The numerical value of the fifth forward speed ratio is 1.

The sixth forward speed ratio is established with the engagement of the clutches 50, 52, 56. The clutch 50 connects the sun gear member 22 to the planet carrier assembly member 36. The clutch 52 connects the sun gear member 22 to the ring gear member 44. The clutch 56 connects the planet carrier assembly member 26 to the sun gear member 32. The sun gear member 22 rotates at the same speed as the planet carrier assembly member 36 and the ring gear member 44. The planet carrier assembly member 26 rotates at the same speed as the sun gear member 32 and the input shaft 17. The ring gear member 24 rotates at the same speed as the output shaft 19. The ring gear member 24, and therefore the output shaft 19, rotates at a speed determined from the speed of the planet carrier assembly member 26, the speed of the sun gear member 22, and the ring gear/sun gear tooth ratio of the planetary gear set 20. The ring gear member 34 rotates at the same speed as the planet carrier assembly member 46. The planet carrier assembly member 36 rotates at a speed determined from the speed of the ring gear member 34, the speed of the sun gear member 32, and the ring gear/sun gear tooth ratio of the planetary gear set 30. The sun gear member 42 does not rotate. The planet carrier assembly member 46 rotates at a speed determined from the speed of the ring gear member 44 and the ring gear/sun gear tooth ratio of the planetary gear set 40. The numerical value of the sixth forward speed ratio is determined utilizing the ring gear/sun gear tooth ratios of the planetary gear sets 20, 30 and 40.

The seventh forward speed ratio is established with the engagement of the clutches 52, 56, and the brake 58. The clutch 52 connects the sun gear member 22 to the ring gear member 44. The clutch 56 connects the planet carrier assembly member 26 to the sun gear member 32. The brake 58 connects the sun gear member 22 to the transmission housing 60. The ring gear member 24 rotates at the same speed as the output shaft 19. The planet carrier assembly member 26 and sun gear member 22 rotate at the same speed as the input shaft 17. The sun gear member 22 and ring gear member 44 do not rotate. The ring gear member 24, and therefore the output shaft 19, rotates at a speed determined from the speed of the planet carrier assembly member 26 and the ring gear/sun gear tooth ratio of the planetary gear set 20. The ring gear member 34 rotates at the same speed as the planet carrier assembly member 46. The sun gear member 42 does not rotate. The numerical value of the seventh forward speed ratio is determined utilizing the ring gear/sun gear tooth ratio of the planetary gear set 20.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between the first and second forward speed ratios is 1.59, while the step ratio between the reverse and first forward ratio is −0.88. It can also be readily determined from the truth table of FIG. 1b that all of the single step forward ratio interchanges are of the single transition variety, as are the double step forward ratio interchanges.

Figures 2A, 2B:
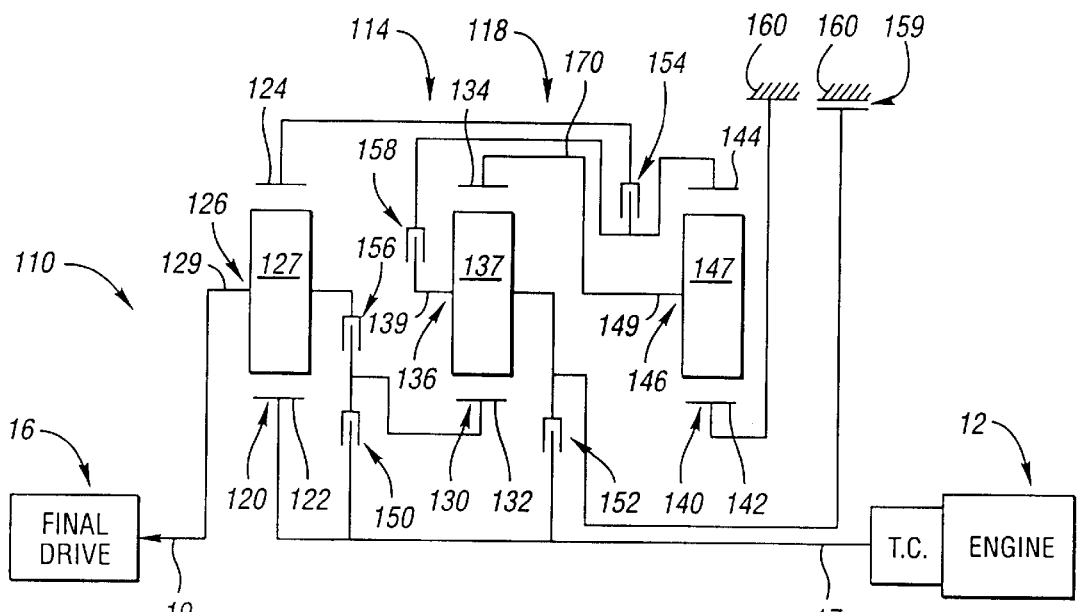

FIG. 2a shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes six torque-transmitting mechanisms 150, 152, 154, 156, 158 and 159. The torque-transmitting mechanisms 150, 152, 154, 156 and 158 are of the rotating-type torque-transmitting mechanisms, commonly termed "clutches." The torque-transmitting mechanism 159 is a stationary-type torque-transmitting mechanism, commonly termed brake or reaction clutch.

The input shaft 17 is continuously connected with the sun gear member 122, and the output shaft 19 is continuously connected with the planet carrier assembly member 126. The sun gear member 142 is continuously connected with the transmission housing 160. The ring gear member 134 is continuously connected with the planet carrier assembly member 146 through the interconnecting member 170.

The sun gear member 122 is selectively connectable with the sun gear member 132 through the clutch 150. The sun gear member 122 is selectively connectable with the planet carrier assembly member 136 through the clutch 152. The ring gear member 124 is selectively connectable with the ring gear member 144 through the clutch 154. The planet carrier assembly member 126 is selectively connectable with the sun gear member 132 through the clutch 156. The planet carrier assembly member 136 is selectively connectable with the ring gear member 144 through the clutch 158. The planet carrier assembly member 136 is selectively connectable with the transmission housing 160 through the brake 159.

The truth table of FIG. 2b describes the engagement sequence utilized to provide eight forward speed ratios and a reverse speed ratio in the planetary gear arrangement 118 shown in FIG. 2a.

The reverse speed ratio is established with the engagement of the clutches 150, 154 and the brake 159. The clutch 150 connects the sun gear member 122 to the sun gear member 132. The clutch 154 connects the ring gear member 124 to the ring gear member 144. The brake 159 connects the planet carrier assembly member 136 to the transmission housing 160. The sun gear members 122, 132 rotate at the same speed as the input shaft 17. The ring gear members 124, 144 rotate at the same speed. The planet carrier assembly member 126 rotates at the same speed as the output shaft 19. The planet carrier assembly member 126, and therefore the output shaft 19, rotates at a speed determined from the speed of the ring gear member 124, the speed of the sun gear member 122, and the ring gear/sun gear tooth ratio of the planetary gear set 120. The planet carrier assembly member 136 does not rotate. The ring gear member 134 rotates at the same speed as the planet carrier assembly member 146. The ring gear member 134 rotates at a speed determined from the speed of the sun gear member 132 and the ring gear/sun gear tooth ratio of the planetary gear set 130. The sun gear member 142 does not rotate. The planet carrier assembly member 146 rotates at a speed determined from the speed of the ring gear member 144, and the ring gear/sun gear tooth ratio of the planetary gear set 140. The numerical value of the reverse speed ratio is determined utilizing the ring gear/sun gear tooth ratios of the planetary gear sets 120, 130 and 140.

The first forward speed ratio is established with the engagement of the clutches 154, 156 and the brake 159. The clutch 154 connects the ring gear member 124 to the ring gear member 144. The clutch 156 connects the planet carrier assembly member 126 to the sun gear member 132. The brake 159 connects the planet carrier assembly member 136 to the transmission housing 160. The sun gear member 122 rotates at the same speed as the input shaft 17. The ring gear member 124 rotates at the same speed as the ring gear member 144. The planet carrier assembly member 126 rotates at the same speed as the sun gear member 132 and the output shaft 19. The planet carrier assembly member 126, and therefore the output shaft 19, rotates at a speed determined from the speed of the ring gear member 124, the speed of the sun gear member 132, and the ring gear/sun gear tooth ratio of the planetary gear set 120. The planet carrier assembly member 136 does not rotate. The ring gear member 134 rotates at the same speed as the planet carrier assembly member 146. The ring gear member 134 rotates at a speed determined from the speed of the sun gear member 132 and the ring gear/sun gear tooth ratio of the planetary gear set 130. The sun gear member 142 does not rotate. The planet carrier assembly member 146 rotates at a speed determined from the speed of the ring gear member 144 and the ring gear/sun gear tooth ratio of the planetary gear set 140. The numerical value of the first forward speed ratio is determined utilizing the ring gear/sun gear tooth ratios of the planetary gear sets 120, 130 and 140.

The second forward speed ratio is established with the engagement of the clutches 154, 158 and the brake 159. The clutch 154 connects the ring gear member 124 to the ring gear member 144. The clutch 158 connects the planet carrier assembly member 136 to the ring gear member 144. The brake 159 connects the planet carrier assembly member 136 to the transmission housing 160. The ring gear member 124 and the planetary gear sets 130, 140 do not rotate. The sun gear member 122 rotates at the same speed as the input shaft 17. The planet carrier assembly member 126 rotates at the same speed as the output shaft 19. The planet carrier assembly member 126, and therefore the output shaft 19, rotates at a speed determined from the speed of the sun gear member 122 and the ring gear/sun gear tooth ratio of the planetary gear set 120. The numerical value of the second forward speed ratio is determined utilizing the ring gear/sun gear tooth ratio of the planetary gear set 120.

The third forward speed ratio is established with the engagement of the clutches 154, 156, 158. The clutch 154 connects the ring gear member 124 to the ring gear member 144. The clutch 156 connects the planet carrier assembly member 126 to the sun gear member 132. The clutch 158 connects the planet carrier assembly member 136 to the ring gear member 144. The sun gear member 122 rotates at the same speed as the input shaft 17. The planet carrier assembly member 126 rotates at the same speed as the output shaft 19 and the sun gear member 132. The ring gear member 124 rotates at the same speed as the ring gear member 144 and the planet carrier assembly member 136. The planet carrier assembly member 126, and therefore the output shaft 19, rotates at a speed determined from the speed of the ring gear member 124, the speed of the sun gear member 122, and the ring gear/sun gear tooth ratio of the planetary gear set 120. The ring gear member 134 rotates at the same speed as the planet carrier assembly member 146. The planet carrier assembly member 136 rotates at a speed determined from the speed of the ring gear member 134, the speed of the sun gear member 132, and the ring gear/sun gear tooth ratio of the planetary gear set 130. The sun gear member 142 does not rotate. The planet carrier assembly member 146 rotates at a speed determined from the speed of the ring gear member 144 and the ring gear/sun gear tooth ratio of the planetary gear set 140. The numerical value of the third forward speed ratio is determined utilizing the ring gear/sun gear tooth ratios of the planetary gear sets 120, 130 and 140.

The fourth forward speed ratio is established with the engagement of the clutches 150, 154, 158. The clutch 150 connects the sun gear member 122 to the sun gear member 132. The clutch 154 connects the ring gear member 124 to the ring gear member 144. The clutch 158 connects the planet carrier assembly member 136 to the ring gear member 144. The sun gear member 122 rotates at the same speed as the sun gear member 132 and the input shaft 17. The planet carrier assembly member 126 rotates at the same speed as the output shaft 19. The ring gear member 124 rotates at the same speed as the ring gear member 144 and the planet carrier assembly member 136. The planet carrier assembly member 126, and therefore the output shaft 19, rotates at a speed determined from the speed of the ring gear member 124, the speed of the sun gear member 122, and the ring gear/sun gear tooth ratio of the planetary gear set 120. The ring gear member 134 rotates at the same speed as the planet carrier assembly member 146. The planet carrier assembly member 136 rotates at a speed determined from the speed of the ring gear member 134, the speed of the sun gear member 132, and the ring gear/sun gear tooth ratio of the planetary gear set 130. The sun gear member 142 does not rotate. The planet carrier assembly member 146 rotates at a speed determined from the speed of the ring gear member 144 and the ring gear/sun gear tooth ratio of the planetary gear set 140. The numerical value of the fourth forward speed ratio is determined utilizing the ring gear/sun gear tooth ratios of the planetary gear sets 120, 130 and 140.

The fifth forward speed ratio is established with the engagement of the clutches 152, 154, 158. In this configuration, the input shaft 17 is directly connected to the output shaft 19. The numerical value of the fifth forward speed ratio is 1.

The sixth forward speed ratio is established with the engagement of the clutches 152, 154, 156. The clutch 152 connects the sun gear member 122 to the planet carrier assembly member 136. The clutch 154 connects the ring gear member 124 to the ring gear member 144. The clutch 156 connects the planet carrier assembly member 126 to the sun gear member 132. The sun gear member 122 rotates at the same speed as the planet carrier assembly member 136 and the input shaft 17. The planet carrier assembly member 126 rotates at the same speed as the sun gear member 132 and the output shaft 19. The ring gear member 124 rotates at the same speed as the ring gear member 144. The planet carrier assembly member 126, and therefore the output shaft 19, rotates at a speed determined from the speed of the ring gear member 124, the speed of the sun gear member 122, and the ring gear/sun gear tooth ratio of the planetary gear set 120. The ring gear member 134 rotates at the same speed as the planet carrier assembly member 146. The planet carrier assembly member 136 rotates at a speed determined from the speed of the ring gear member 134, the speed of the sun gear member 132, and the ring gear/sun gear tooth ratio of the planetary gear set 130. The sun gear member 142 does not rotate. The planet carrier assembly member 146 rotates at a speed determined from the speed of the ring gear member 144 and the ring gear/sun gear tooth ratio of the planetary gear set 140. The numerical value of the sixth forward speed ratio is determined utilizing the ring gear/sun gear tooth ratios of the planetary gear sets 120, 130 and 140.

The seventh forward speed ratio is established with the engagement of the clutches 150, 152, 154. The clutch 150 connects the sun gear member 122 to the sun gear member 132. The clutch 152 connects the sun gear member 122 to the planet carrier assembly member 136. The clutch 154 connects the ring gear member 124 to the ring gear member 144. The sun gear members 122, 132 and the planet carrier assembly member 136 rotate at the same speed as the input shaft 17. The ring gear member 124 rotates at the same speed as the ring gear member 144. The planet carrier assembly member 126 rotates at the same speed as the output shaft 19. The planet carrier assembly member 126, and therefore the output shaft 19, rotates at a speed determined from the speed of the ring gear member 124, the speed of the sun gear member 132, and the ring gear/sun gear tooth ratio of the planetary gear set 120. The ring gear member 134 rotates at the same speed as the planet carrier assembly member 146. The planet carrier assembly member 146 rotates at a speed determined from the speed of the ring gear member 144 and the ring gear/sun gear tooth ratio of the planetary gear set 140. The numerical value of the seventh forward speed ratio is determined utilizing the ring gear/sun gear tooth ratios of the planetary gear sets 120 and 140.

The eighth forward speed ratio is established with the engagement of the clutches 152, 156, 158. The clutch 152 connects the sun gear member 122 to the planet carrier assembly member 136. The clutch 156 connects the planet carrier assembly member 126 to the sun gear member 132. The clutch 158 connects the planet carrier assembly member 136 to the ring gear member 144. The planet carrier assembly member 126 rotates at the same speed as the sun gear member 132 and the output shaft 19. The sun gear member 122 rotates at the same speed as the planet carrier assembly member 136, the ring gear member 144, and the input shaft 17. The ring gear member 134 rotates at the same speed as the planet carrier assembly member 146. The planet carrier assembly member 136 rotates at a speed determined from the speed of the ring gear member 134, the speed of the sun gear member 132, and the ring gear/sun gear tooth ratio of the planetary gear set 130. The sun gear member 142 does not rotate. The planet carrier assembly member 146 rotates at a speed determined from the speed of the ring gear member 144 and the ring gear/sun gear tooth ratio of the planetary gear set 140. The numerical value of the eighth forward speed ratio is determined utilizing the ring gear/sun gear tooth ratios of the planetary gear sets 130 and 140.

As set forth above, the truth table of FIG. 2b describes the engagement sequence of the torque-transmitting mechanisms utilized to provide a reverse drive ratio and eight forward speed ratios. It can be readily determined from the truth table that all of the single step forward interchanges are of the single transition type, as are the double step forward interchanges. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2b are the ratio steps between single step ratios in the forward direction as well as the reverse to first ratio step ratio. For example, the first to second step ratio is 1.52.

Figures 3A, 3B:
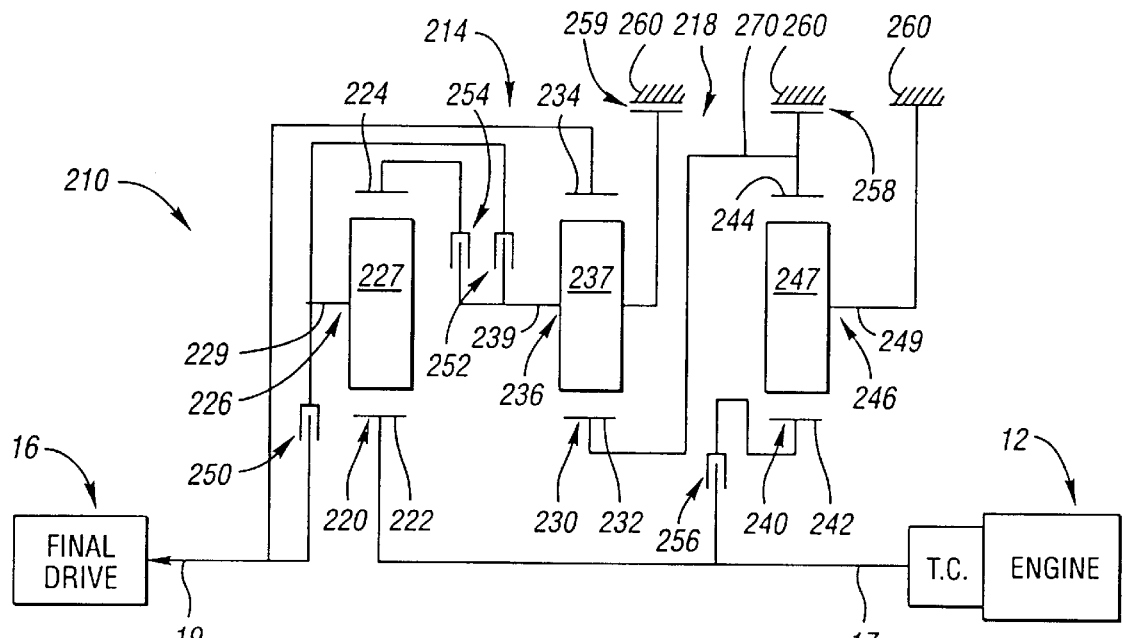

Turning to FIG. 3a, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes six torque-transmitting mechanisms 250, 252, 254, 256, 258 and 259. The torque-transmitting mechanisms 250, 252, 254 and 256 are of the rotating type torque-transmitting mechanisms, commonly termed clutches. The torque-transmitting mechanisms 258 and 259 are stationary type torque-transmitting mechanisms, commonly termed brakes or reaction clutches.

The input shaft 17 is continuously connected with the sun gear member 222, and the output shaft 19 is continuously connected with the ring gear member 234. The planet carrier assembly member 246 is continuously connected with the transmission housing 260. The sun gear member 232 is continuously connected with the ring gear member 244 through the interconnecting member 270.

The planet carrier assembly member 226 is selectively connectable with the ring gear member 234 through the clutch 250. The planet carrier assembly member 226 is selectively connectable with the planet carrier assembly member 236 through the clutch 252. The ring gear member 224 is selectively connectable with the planet carrier assembly member 236 through the clutch 254. The sun gear member 222 is selectively connectable with the sun gear member 242 through the clutch 256. The ring gear member 244 is selectively connectable with the transmission housing 260 through the brake 258. The planet carrier assembly member 236 is selectively connectable with the transmission housing 260 through the brake 259.

As shown in the truth table in FIG. 3b, the torque-transmitting mechanisms are engaged in combinations of three to establish seven forward speed ratios and one reverse ratio.

The reverse speed ratio is established with the engagement of the clutches 250, 252, 256. The clutch 250 connects the planet carrier assembly member 226 to the ring gear member 234. The clutch 252 connects the planet carrier assembly member 226 to the planet carrier assembly member 236. The clutch 256 connects the sun gear member 222 to the sun gear member 242. The sun gear members 222, 242 rotate at the same speed as the input shaft 17. The planet carrier assembly members 226, 236 and the ring gear member 234 rotate at the same speed as the output shaft 19. The sun gear member 232 rotates at the same speed as the ring gear member 244. The planet carrier assembly member 246 does not rotate. The ring gear member 244 rotates at a speed determined from the speed of the sun gear member 242 and the ring gear/sun gear tooth ratio of the planetary gear set 240. The numerical value of the reverse speed ratio is determined utilizing the ring gear/sun gear tooth ratio of the planetary gear set 240.

The first forward speed ratio is established with the engagement of the clutches 250, 256 and the brake 259. The clutch 250 connects the planet carrier assembly member 226 to the ring gear member 234. The clutch 256 connects the sun gear member 222 to the sun gear member 242. The brake 259 connects the planet carrier assembly member 236 to the transmission housing 260. The sun gear members 222, 242 rotate at the same speed as the input shaft 17. The planet carrier assembly member 226 and ring gear member 234 rotate at the same speed as the output shaft 19. The planet carrier assembly member 236 does not rotate. The sun gear member 232 rotates at the same speed as the ring gear member 244. The ring gear member 234, and therefore the output shaft 19, rotates at a speed determined from the speed of the sun gear member 232 and the ring gear/sun gear tooth ratio of the planetary gear set 230. The planet carrier assembly member 246 does not rotate. The ring gear member 244 rotates at a speed determined from the speed of the sun gear member 242 and the ring gear/sun gear tooth ratio of the planetary gear set 240. The numerical value of the first forward speed ratio is determined utilizing the ring gear/sun gear tooth ratios of the planetary gear sets 230 and 240.

The second forward speed ratio is established with the engagement of the clutches 250, 254 and the brake 259. The clutch 250 connects the planet carrier assembly member 226 to the ring gear member 234. The clutch 254 connects the ring gear member 224 to the planet carrier assembly member 236. The brake 259 connects the planet carrier assembly member 236 to the transmission housing 260. The sun gear member 222 rotates at the same speed as the input shaft 17. The planet carrier assembly member 226 and ring gear member 234 rotate at the same speed as the output shaft 19. The ring gear member 224 and planet carrier assembly member 236 do not rotate. The planet carrier assembly member 226 rotates at a speed determined from the speed of the sun gear member 222 and the ring gear/sun gear tooth ratio of the planetary gear set 220. The sun gear member 232 rotates at the same speed as ring gear member 244. The planet carrier assembly member 246 does not rotate. The numerical value of the second forward speed ratio is determined utilizing the ring gear/sun gear tooth ratio of the planetary gear set 220.

The third forward speed ratio is established with the engagement of the clutches 250, 254, 256. The clutch 250 connects the planet carrier assembly member 226 to the ring gear member 234. The clutch 254 connects the ring gear member 224 to the planet carrier assembly member 236. The clutch 256 connects the sun gear member 222 to the sun gear member 242. The sun gear members 222, 242 rotate at the same speed as the input shaft 17. The planet carrier assembly member 226 and ring gear member 234 rotate at the same speed output shaft 19. The ring gear member 224 rotates at the same speed as the planet carrier assembly member 236. The planet carrier assembly member 226 rotates at a speed determined from the speed of the ring gear member 224, the speed of the sun gear member 222, and the ring gear/sun gear tooth ratio of the planetary gear set 220. The sun gear member 232 rotates at the same speed as the ring gear member 244. The ring gear member 234 rotates at a speed determined from the speed of the planet carrier assembly member 236, the speed of the sun gear member 232, and the ring gear/sun gear tooth ratio of the planetary gear set 230. The planet carrier assembly member 246 does not rotate. The ring gear member 244 rotates at a speed determined from the speed of the sun gear member 242 and the ring gear/sun gear tooth ratio of the planetary gear set 240. The numerical value of the third forward speed ratio is determined utilizing the ring gear/sun gear tooth ratios of the planetary gear sets 220, 230 and 240.

The fourth forward speed ratio is established with the engagement of the clutches 250, 254 and the brake 258. The clutch 250 connects the planet carrier assembly member 226 to the ring gear member 234. The clutch 254 connects the ring gear member 224 to the planet carrier assembly member 236. The brake 258 connects the ring gear member 244 to the transmission housing 260. The sun gear member 222 rotates at the same speed as the input shaft 17. The planet carrier assembly member 226 and ring gear member 234 rotate at the same speed as the output shaft 19. The ring gear member 224 and the planet carrier assembly member 236 rotate at the same speed. The planet carrier assembly member 226 rotates at a speed determined from the speed of the ring gear member 224, the speed of the sun gear member 222, and the ring gear/sun gear tooth ratio of the planetary gear set 220. The sun gear member 232 and planetary gear set 240 do not rotate. The planet carrier assembly member 236 rotates at a speed determined from the speed of the ring gear member 234 and the ring gear/sun gear tooth ratio of the planetary gear set 230. The numerical value of the fourth forward speed ratio is determined utilizing the ring gear/sun gear tooth ratios of the planetary gear sets 220 and 230.

The fifth forward speed ratio is established with the engagement of the clutches 250, 252, 254. In this configuration, the input shaft 17 is directly connected to the output shaft 19. The numerical value of the fifth forward speed ratio is 1.

The sixth forward speed ratio is established with the engagement of the clutches 252, 254 and the brake 258. The clutch 252 connects the planet carrier assembly member 226 to the planet carrier assembly member 236. The clutch 254 connects the ring gear member 224 to the planet carrier assembly member 236. The brake 258 connects the ring gear member 244 to the transmission housing 260. The sun gear member 222 rotates at the same speed as the input shaft 17. The planet carrier assembly members 226, 236 rotate at the same speed as the ring gear member 224. The ring gear member 234 rotates at the same speed as the output shaft 19. The sun gear member 232 and the planetary gear set 240 do not rotate. The ring gear member 234, and therefore the output shaft 19, rotates at a speed determined from the speed of the planet carrier assembly member 236 and the ring gear/sun gear tooth ratio of the planetary gear set 230. The numerical value of the sixth forward speed ratio is determined utilizing the ring gear/sun gear tooth ratio of the planetary gear set 230.

The seventh forward speed ratio is established with the engagement of the clutches 252, 254, 256. The clutch 252 connects the planet carrier assembly member 226 to the planet carrier assembly member 236. The clutch 254 connects the ring gear member 224 to the planet carrier assembly member 236. The clutch 256 connects the sun gear member 222 to the sun gear member 242. The sun gear members 222, 242 rotate at the same speed as the input shaft 17. The planet carrier assembly members 226, 236 rotate at the same speed as the ring gear member 224. The ring gear member 234 rotates at the same speed as the output shaft 19. The sun gear member 232 rotates at the same speed as the ring gear member 244. The ring gear member 234 rotates at a speed determined from the speed of the planet carrier assembly member 236, the speed of the sun gear member 232, and the ring gear/sun gear tooth ratio of the planetary gear set 230. The planet carrier assembly member 246 does not rotate. The ring gear member 244 rotates at a speed determined from the speed of the sun gear member 242 and the ring gear/sun gear tooth ratio of the planetary gear set 240. The numerical value of the seventh forward speed ratio is determined utilizing the ring gear/sun gear tooth ratios of the planetary gear sets 230 and 240.

As previously set forth, the truth table of FIG. 3b describes the combinations of engagements utilized for the seven forward speed ratios and reverse ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse speed ratio. For example, the first to second ratio interchange has a step of 1.68. It can also be readily determined from the truth table of FIG. 3b that all of the single step forward ratio interchanges are of the single transition variety, as are all of the double step forward interchanges.

Figures 4A, 4B:
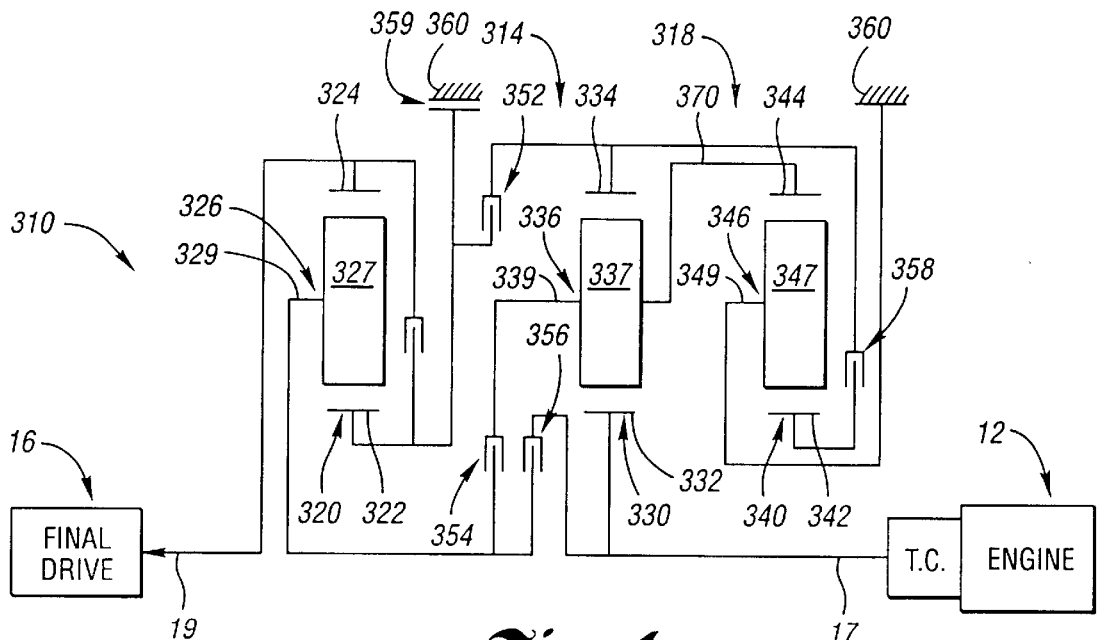

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 33o and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes six torque-transmitting mechanisms 350, 352, 354, 356, 358 and 359. The torque-transmitting mechanisms 350, 352, 354, 356 and 358 are of the rotating type torque-transmitting mechanisms, commonly termed clutches. The torque-transmitting mechanism 359 is a stationary type torque-transmitting mechanism, commonly termed brake or reaction clutch.

The input shaft 17 is continuously connected with the sun gear member 332, and the output shaft 19 is continuously connected with the ring gear member 324. The planet carrier assembly member 346 is continuously connected with the transmission housing 360. The planet carrier assembly member 336 is continuously connected with the ring gear member 344 through the interconnecting member 370.

The sun gear member 322 is selectively connectable with the ring gear member 324 through the clutch 350. The sun gear member 322 is selectively connectable with the ring gear member 334 through the clutch 352. The planet carrier assembly member 326 is selectively connectable with the planet carrier assembly member 336 through the clutch 354. The planet carrier assembly member 326 is selectively connectable with the sun gear member 332 through the clutch 356. The ring gear member 334 is selectively connectable with the sun gear member 342 through the clutch 358. The sun gear member 322 is selectively connectable with the transmission housing 360 through the brake 359.

The truth tables given in. FIGS. 4b, 5b, 6b, 7b, 8b, 9b, 10b, 11b, 12b, 13b, 14b, 15b, 16b, 17b, 18b, 19b and 20b show the engagement sequences for the torque-transmitting mechanisms to provide at least seven forward speed ratios and at least one reverse ratio. As shown and described above for the configuration in FIGS. 1a, 2a and 3a, those skilled in the art will understand from the respective truth tables how the speed ratios are established through the planetary gear sets identified in the written description.

The truth table shown in FIG. 4b describes the engagement combination and the engagement sequence necessary to provide the reverse drive ratio and seven forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.5. It can be readily determined from the truth table of FIG. 4b that each of the forward single step ratio interchanges is a single transition shift, as are the double step interchanges. The chart also shows that the torque-transmitting mechanisms 350 and 358 can be engaged through the neutral condition to simplify the forward/reverse interchange.

Those skilled in the art will recognize that the numerical values of the reverse and first forward speed ratios are determined utilizing the ring gear/sun gear tooth ratios of the planetary gear sets 330 and 340. The numerical values of the second, third and seventh forward speed ratios are determined utilizing the ring gear/sun gear tooth ratios of the planetary gear sets 320, 330 and 340. The numerical value of the fourth forward speed ratio is determined utilizing the ring gear/sun gear tooth ratios of the planetary gear sets 320 and 330. The numerical value of the fifth forward speed ratio is 1. The numerical value of the sixth forward speed ratio is determined utilizing the ring gear/sun gear tooth ratio of the planetary gear set 320.

Figures 5A, 5B:
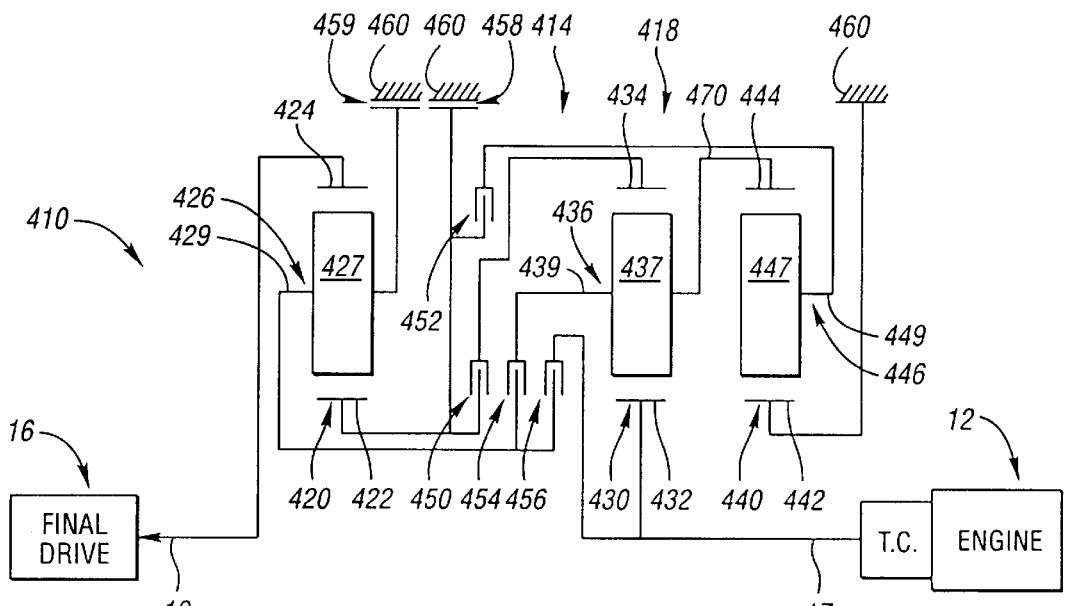

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes six torque-transmitting mechanisms 450, 452, 454, 456, 458 and 459. The torque-transmitting mechanisms 450, 452, 454 and 456 are rotating-type torque-transmitting mechanisms, commonly termed clutches. The torque-transmitting mechanisms 458 and 459 are stationary-type torque-transmitting mechanisms, commonly termed brakes or reaction clutches.

The input shaft 17 is continuously connected with the sun gear member 432, and the output shaft 19 is continuously connected with the ring gear member 424. The sun gear member 442 is continuously connected with the transmission housing 460. The planet carrier assembly member 436 is continuously connected with the ring gear member 444 through the interconnecting member 470.

The sun gear member 422 is selectively connectable with the ring gear member 434 through the clutch 450. The sun gear member 422 is selectively connectable with the planet carrier assembly member 446 through the clutch 452. The planet carrier assembly member 426 is selectively connectable with the planet carrier assembly member 436 through the clutch 454. The planet carrier assembly member 426 is selectively connectable with the sun gear member 432 through the clutch 456. The sun gear member 422 is selectively connectable with the transmission housing 460 through the brake 458. The planet carrier assembly member 426 is selectively connectable with the transmission housing 460 through the brake 459.

The truth table shown in FIG. 5b describes the engagement combination and sequence of the torque-transmitting mechanisms 450, 452, 454, 456, 458 and 459 that are employed to provide the reverse drive ratio and the seven forward speed ratios. It should be noted that the torque-transmitting mechanisms 450 and 459 are engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440. As can also be determined from the truth table of FIG. 5b, the single step forward interchanges are single transition shifts, as are the double step interchanges in the forward direction.

FIG. 5b also provides a chart of the ratio steps between adjacent forward ratios and between the reverse and first forward ratio. For example, the ratio step between the first and second forward ratios is 1.76.

Those skilled in the art will recognize that the numerical values of the reverse, third and sixth forward speed ratios are determined utilizing the ring gear/sun gear tooth ratios of the planetary gear sets 420, 430 and 440. The numerical values of the first and second forward speed ratios are determined utilizing the ring gear/sun gear tooth ratios of the planetary gear sets 420 and 430. The numerical value of the fourth forward speed ratio is 1. The numerical value of the fifth forward speed ratio is determined utilizing the ring: gear/sun gear tooth ratios of the planetary gear sets 420 and 440. The numerical value of the seventh forward speed ratio is determined utilizing the ring gear/sun gear tooth ratio of the planetary gear set 420.

Figures 6A, 6B:
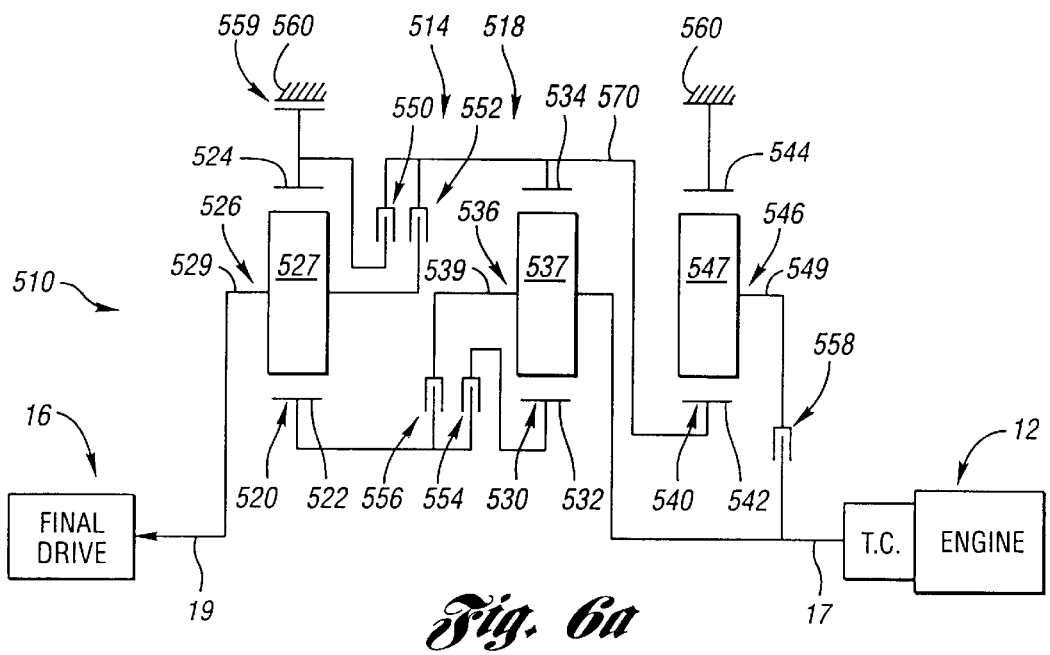

A powertrain 510, shown in FIG. 6a, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes six torque-transmitting mechanisms 550, 552, 554, 556, 558 and 559. The torque-transmitting mechanisms 550, 552, 554, 556 and 558 are rotating-type torque-transmitting mechanisms, commonly termed clutches. The torque-transmitting mechanism 559 is a stationary-type torque-transmitting mechanism, commonly termed brake or reaction clutch.

The input shaft 17 is continuously connected with the planet carrier assembly member 536, and the output shaft 19 is continuously connected with the planet carrier assembly member 526. The ring gear member 544 is continuously connected with the transmission housing 560. The ring gear member 534 is continuously connected with the sun gear member 542 through the interconnecting member 570.

The ring gear member 524 is selectively connectable with the ring gear member 534 through the clutch 550. The planet carrier assembly member 526 is selectively connectable with the ring gear member 534 through the clutch 552. The sun gear member 522 is selectively connectable with the sun gear member 532 through the clutch 554. The sun gear member 522 is selectively connectable with the planet carrier assembly member 536 through the clutch 556. The planet carrier assembly member 536 is selectively connectable with the planet carrier assembly member 546 through the clutch 558. The ring gear member 524 is selectively connectable with the transmission housing 560 through the brake 559.

The truth table shown in FIG. 6b describes the engagement sequence and combination of the torque-transmitting mechanisms to provide the reverse speed ratio and seven forward speed ratios. It should be noted that the torque-transmitting mechanisms 552 and 559 can remain engaged through the neutral condition, thereby simplifying the forward/reverse interchange. It can also be determined from the truth table of FIG. 6b that all of the single step forward ratio interchanges are of the single transition variety, as are all of the double step forward interchanges. The chart of FIG. 6b describes the ratio steps between adjacent forward speed ratios and the ratio step between the reverse and first forward speed ratio.

Those skilled in the art, upon reviewing the truth table and the schematic representation of FIG. 6a, can determine that the numerical values of the reverse and fifth forward speed ratios are determined utilizing the ring gear/sun gear tooth ratios of the planetary gear sets 520, 530 and 540. The numerical value of the first forward speed ratio is determined utilizing the ring gear/sun gear tooth ratio of the planetary gear set 520. The numerical values of the second and third forward speed ratios are determined utilizing the ring gear/sun gear tooth ratios of the planetary gear sets 520 and 530. The numerical value of the fourth forward speed ratio is 1. The numerical value of the sixth forward speed ratio is determined utilizing the ring gear/sun gear tooth ratios of the planetary gear sets 520 and 540. The numerical value of the seventh forward speed ratio is determined utilizing the ring gear/sun gear tooth ratio of the planetary gear set 540.

The sample speed ratios given in the truth table are determined utilizing the tooth ratio values also given in FIG. 6b. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
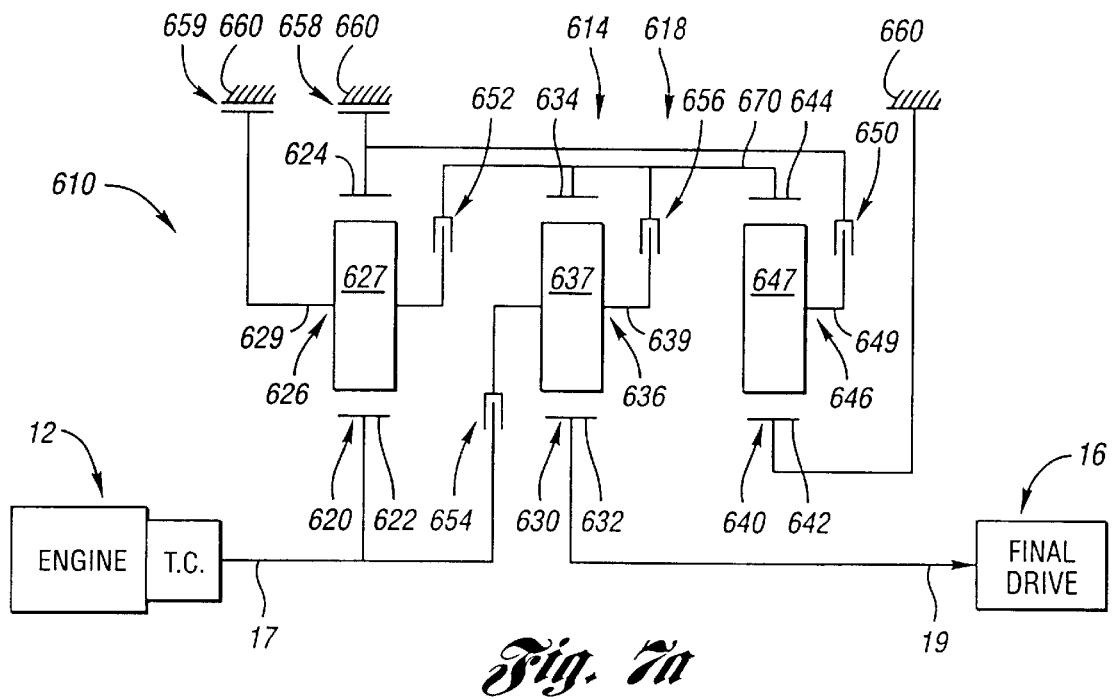

A powertrain 610, shown in FIG. 7a, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes six torque-transmitting mechanisms 650, 652, 654, 656, 658 and 659. The torque-transmitting mechanisms 650, 652, 654 and 656 are of the rotating-type torque-transmitting mechanisms, commonly termed clutches. The torque-transmitting mechanisms 658 and 659 are stationary-type torque-transmitting mechanisms, commonly termed brakes or reaction clutches.

The input shaft 17 is continuously connected with the sun gear member 622, and the output shaft 19 is continuously connected with the sun gear member 632. The sun gear member 642 is continuously connected with the transmission housing 66o. The ring gear member 634 is continuously connected with the ring gear member 644 through the interconnecting member 670.

The ring gear member 624 is selectively connectable with the planet carrier assembly member 646 through the clutch 650. The planet carrier assembly member 626 is selectively connectable with the ring gear member 634 through the clutch 652. The sun gear member 622 is selectively connectable with the planet carrier assembly member 636 through the clutch 654. The planet carrier assembly member 636 is selectively connectable with the ring gear member 644 through the clutch 656. The ring gear member 624 is selectively connectable with the transmission housing 660 through the brake 658. The planet carrier assembly member 626 is selectively connectable with the transmission housing 660 through the brake 659.

The truth table shown in FIG. 7b describes the combination of torque-transmitting mechanism engagements that will provide the reverse drive ratio and seven forward speed ratios, as well as the sequence of these engagements and interchanges. The torque-transmitting mechanisms 652 and 656 can be engaged through the neutral condition, thereby simplifying the forward/reverse interchange. It can be noted from the truth table that each of the single step forward interchanges are single transition ratio changes, as are the double step forward interchanges.

The ratio values given are by way of example and are established utilizing the ring gear/sun gear tooth ratios given in FIG. 7b. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Those skilled in the art will, upon reviewing the truth table of FIG. 7b, recognize that the numerical values of the reverse and second forward speed ratios are determined utilizing the ring gear/sun gear tooth ratios of the planetary gear sets 620 and 640. The numerical value of the first forward speed ratio is determined utilizing the ring gear/sun gear tooth ratio of the planetary gear set 620. The numerical value of the third forward speed ratio is 1. The numerical values of the fourth and seventh forward speed ratios are determined utilizing the ring gear/sun gear tooth ratios of the planetary gear sets 620, 630 and 640. The numerical value of the fifth forward speed ratio is determined utilizing the ring gear/sun gear tooth ratios of the planetary gear sets 620 and 630. The numerical value of the sixth forward speed ratio is determined utilizing the ring gear/sun gear tooth ratio of the planetary gear set 630.

Figures 8A, 8B:
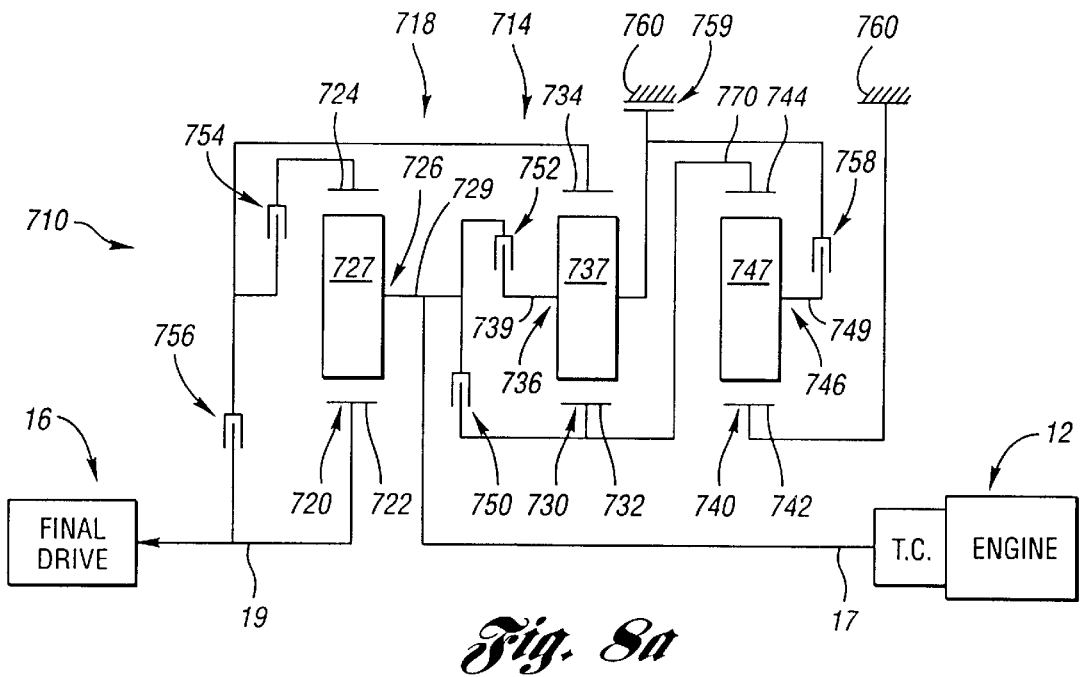

A powertrain 710, shown in FIG. 8a, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes six torque-transmitting mechanisms 750, 752, 754, 756, 758 and 759. The torque-transmitting mechanisms 750, 752, 754, 756 and 758 are of the rotating-type torque-transmitting mechanisms, commonly termed clutches. The torque-transmitting mechanism 759 is a stationary-type torque-transmitting mechanism, commonly termed brake or reaction clutch.

The input shaft 17 is continuously connected with the planet carrier assembly member 726, and the output shaft 19 is continuously connected with the sun gear member 722. The sun gear member 742 is continuously connected with the transmission housing 760. The sun gear member 732 is continuously connected with the ring gear member 744 through the interconnecting member 770.

The planet carrier assembly member 726 is selectively connectable with the sun gear member 732 through the clutch 750. The planet carrier assembly member 726 is selectively connectable with the planet carrier assembly member 736 through the clutch 752 The ring gear member 724 is selectively connectable with the ring gear member 734 through the clutch 754. The sun gear member 722 is selectively connectable with the ring gear member 734 through the clutch 756. The planet carrier assembly member 736 is selectively connectable with the planet carrier assembly member 746 through the clutch 758. The planet carrier assembly member 736 is selectively connectable with the transmission housing 760 through the brake 759.

The truth table of FIG. 8b defines the torque-transmitting mechanism engagement sequence utilized for each of the forward speed ratios and the reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740. As can also be determined from the truth table of FIG. 8b, the single step forward interchanges are single transition shifts, as are the double step interchanges in the forward direction.

FIG. 8b also provides a chart of the ratio steps between adjacent forward ratios and between the reverse and first forward ratio. For example, the ratio step between the first and second forward ratios is 1.67. Those skilled in the art will recognize that the numerical value of the reverse speed ratio is determined utilizing the ring gear/sun gear tooth ratio of the planetary gear set 730. The numerical values of the first and second forward speed ratios are determined utilizing the ring gear/sun gear tooth ratios of the planetary gear sets 730 and 740. The numerical value of the third forward speed ratio is 1. The numerical values of the fourth and fifth forward speed ratios are determined utilizing the ring gear/sun gear tooth ratios of the planetary gear sets 720, 730 and 740. The numerical value of the sixth forward speed ratio is determined utilizing the ring gear/sun gear tooth ratio of the planetary gear set 720. The numerical value of the seventh forward speed ratio is determined utilizing the ring gear/sun gear tooth ratios of the planetary gear sets 720 and 730.

Figures 9A, 9B:
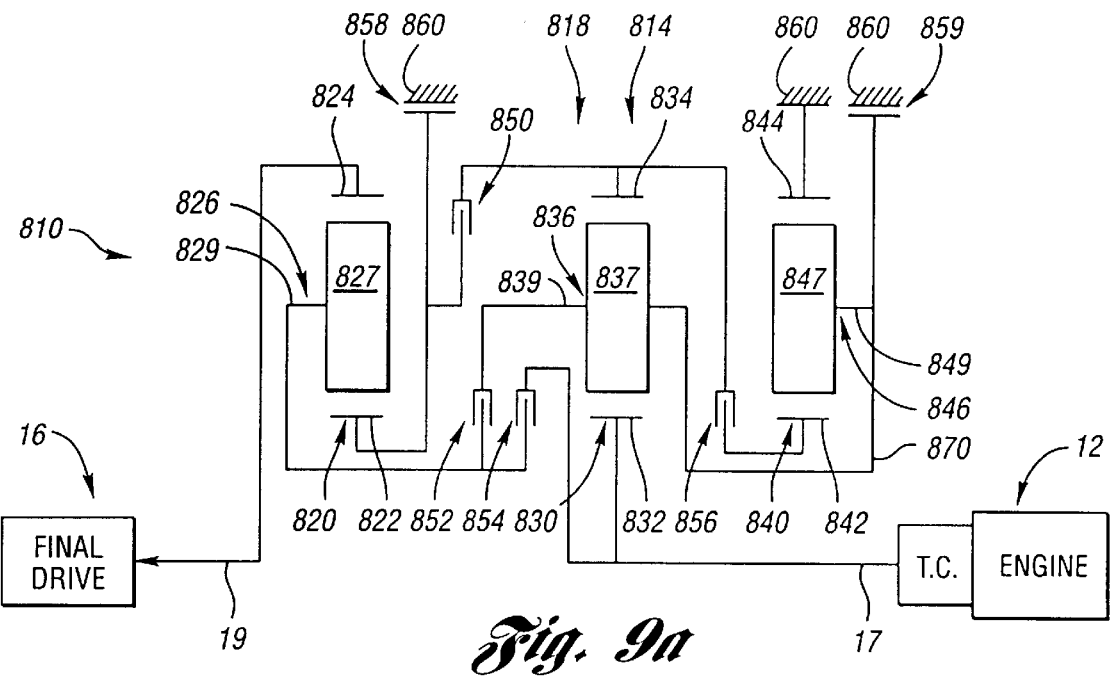

A powertrain 810, shown in FIG. 9a, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear arrangement 818 also includes six torque-transmitting mechanisms 850, 852, 854, 856, 858 and 859. The torque-transmitting mechanisms 850, 852, 854 and 856 are of the rotating-type torque-transmitting mechanisms, commonly termed clutches. The torque-transmitting mechanisms 858 and 859 are stationary-type torque-transmitting mechanisms, commonly termed brakes or reaction clutches.

The input shaft 17 is continuously connected with the sun gear member 832, and the output shaft 19 is continuously connected with the ring gear member 824. The ring gear member 844 is continuously connected with the transmission housing 860. The planet carrier assembly member 836 is continuously connected with the planet carrier assembly member 846 through the interconnecting member 870.

The sun gear member 822 is selectively connectable with the ring gear member 834 through the clutch 850. The planet carrier assembly member 826 is selectively connectable with the planet carrier assembly member 836 through the clutch 852. The planet carrier assembly member 826 is selectively connectable with the sun gear member 832 through the clutch 854. The ring gear member 834 is selectively connectable with the sun gear member 842 through the clutch 856. The sun gear member 822 is selectively connectable with the transmission housing 86o through the brake 858. The planet carrier assembly member 846 is selectively connectable with the transmission housing 860 through the brake 859.

The truth table shown in FIG. 9b defines the torque-transmitting mechanism engagement sequence that provides the reverse ratio and seven forward speed ratios shown in the truth table and available with the planetary gear arrangement 818. The truth table indicates that the torque-transmitting mechanisms 852 and 856 can remain engaged through the neutral condition, thereby simplifying the forward/reverse interchange. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of the planetary gear set 830; and the R3/S3 value is the tooth ratio of the planetary gear set 840. It can be readily recognized from the truth table that all of the single and double step forward interchanges are single transition ratio interchanges. FIG. 9b also describes the ratio steps between adjacent forward ratios and between the reverse and first forward ratio. For example, the ratio step between the first and second forward ratios is 1.59.

Those skilled in the art of planetary transmissions will recognize that the numerical values of the reverse, first and seventh forward speed ratios are determined utilizing the ring gear/sun gear tooth ratios of the planetary gear sets 820, 830 and 840. The numerical values of the second, third and sixth forward speed ratios are determined utilizing the ring gear/sun gear tooth ratios of the planetary gear sets 820 and 830. The numerical value of the fourth forward speed ratio is 1. The numerical value of the fifth forward speed ratio is determined utilizing the ring gear/sun gear tooth ratio of the planetary gear set 820.

Figures 10A, 10B:
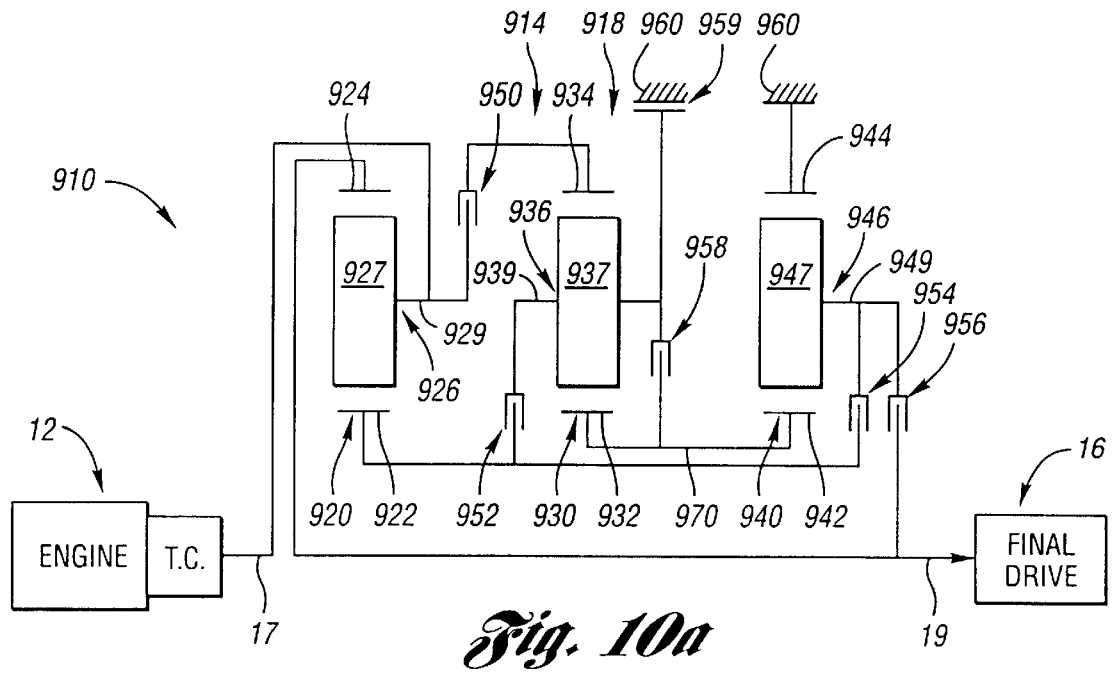

The powertrain 910, shown in FIG. 10a, includes the conventional engine and torque converter 12, a planetary transmission 914, and the conventional final drive mechanism 16. The engine and torque converter 12 are drivingly connected with the planetary transmission 914 through the input shaft 17. The planetary transmission 914 is drivingly connected with the final drive mechanism 16 through the output shaft 19. The planetary transmission 914 includes a planetary gear arrangement 918 that has a first planetary gear set 920, a second planetary gear set 930, and a third planetary gear set 940.

The planetary gear set 920 includes a sun gear member 922, a ring gear member 924, and a planet carrier assembly 926. The planet carrier assembly 926 includes a plurality of pinion gears 927 that are rotatably mounted on a carrier member 929 and disposed in meshing relationship with the sun gear member 922 and the ring gear member 924, respectively.

The planetary gear set 930 includes a sun gear member 932, a ring gear member 934, and a planet carrier assembly member 936. The planet carrier assembly member 936 includes a plurality of pinion gears 937 rotatably mounted on a carrier member 939 and disposed in meshing relationship with both the sun gear member 932 and the ring gear member 934.

The planetary gear set 940 includes a sun gear member 942, a ring gear member 944, and a planet carrier assembly member 946. The planet carrier assembly member 946 includes a plurality of pinion gears 947 rotatably mounted on a carrier member 949 and disposed in meshing relationship with both the sun gear member 942 and the ring gear member 944.

The planetary gear arrangement 918 also includes six torque-transmitting mechanisms 950, 952, 954, 956, 958 and 959. The torque-transmitting mechanisms 950, 952, 954, 956 and 958 are of the rotating-type torque-transmitting mechanisms, commonly termed clutches. The torque-transmitting mechanism 959 is a stationary-type torque-transmitting mechanism, commonly termed brake or reaction clutch.

The input shaft 17 is continuously connected with the planet carrier assembly member 926, and the output shaft 19 is continuously connected with the ring gear member 924. The ring gear member 944 is continuously connected with the transmission housing 960. The sun gear member 932 is continuously connected with the sun gear member 942 through the interconnecting member 970.

The planet carrier assembly member 926 is selectively connectable with the ring gear member 934 through the clutch 950. The sun gear member 922 is selectively connectable with the planet carrier assembly member 936 through the clutch 952. The sun gear member 922 is selectively connectable with the planet carrier assembly member 946 through the clutch 954. The ring gear member 924 is selectively connectable with the planet carrier assembly member 946 through the clutch 956. The sun gear member 932 is selectively connectable with the planet carrier assembly member 936 through the clutch 958. The planet carrier assembly member 936 is selectively connectable with the transmission housing 960 through the brake 959.

The truth table of FIG. 10b describes the torque-transmitting mechanism engagement sequence utilized to provide the reverse speed ratio and seven forward speed ratios. The truth table also provides a set of examples for the ratios for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; and the R3/S3 value is the tooth ratio of the planetary gear set 940. It can also be determined from the truth table of FIG. 10b that each of the forward single step ratio interchanges are of the single transition variety, as are the double step interchanges.

Those skilled in the art, upon reviewing the engagement combinations, will recognize that the numerical value of the reverse speed ratio is determined utilizing the ring gear/sun gear tooth ratios of the planetary gear sets 930 and 940. The numerical value of the first forward speed ratio is determined utilizing the ring gear/sun gear tooth ratio of the planetary gear set 940. The numerical values of the second, fifth and sixth forward speed ratios are determined utilizing the ring gear/sun gear tooth ratios of the planetary gear sets 920 and 940. The numerical values of the third and seventh forward speed ratios are determined utilizing the ring gear/sun gear tooth ratios of the planetary gear sets 920, 930 and 940. The numerical value of the fourth forward speed ratio is 1.

Figures 11A, 11B:
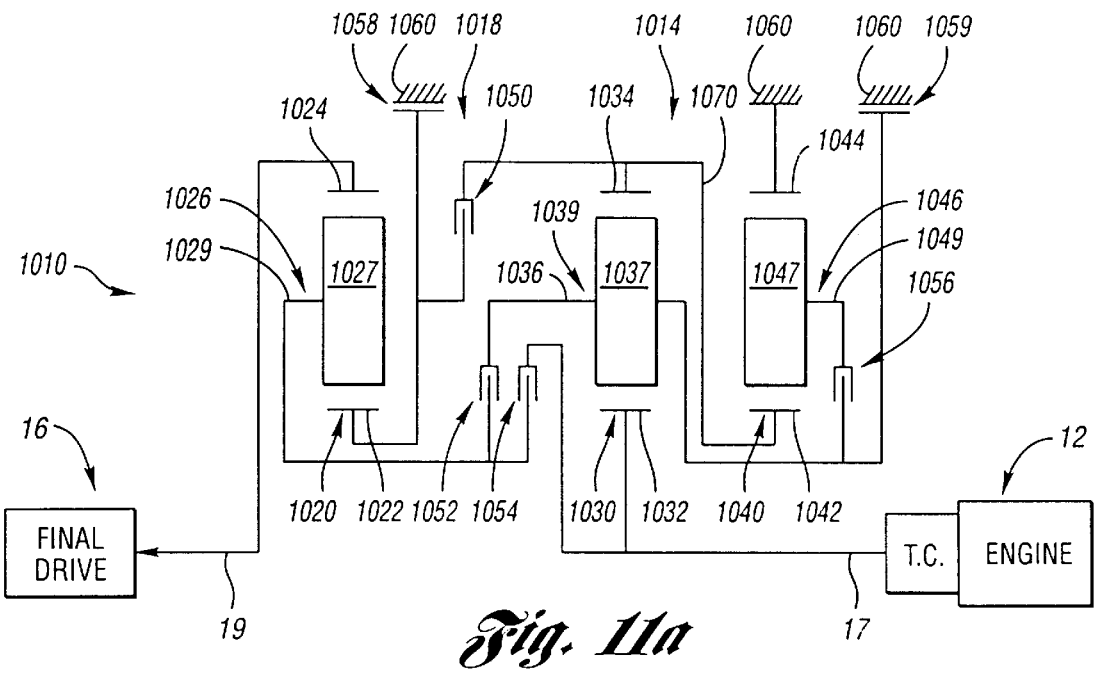

A powertrain 1010, shown in FIG. 11a, includes the conventional engine and torque converter 12, a planetary transmission 1014, and the conventional final drive mechanism 16. The engine and torque converter are drivingly connected with the planetary transmission 1014 through the input shaft 17. The planetary transmission 1014 is drivingly connected with the final drive mechanism 16 through the output shaft 19. The planetary transmission 1014 includes a planetary gear arrangement 1018 that has a first planetary gear set 1020, a second planetary gear set 1030, and a third planetary gear set 1040.

The planetary gear set 1020 includes a sun gear member 1022, a ring gear member 1024, and a planet carrier assembly 1026. The planet carrier assembly 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gear set 1040 includes a sun gear member 1042, a ring gear member 1044, and a planet carrier assembly member 1046. The planet carrier assembly member 1046 includes a plurality of pinion gears 1047 rotatably mounted on a carrier member 1049 and disposed in meshing relationship with both the sun gear member 1042 and the ring gear member 1044.

The planetary gear arrangement 1008 also includes six torque-transmitting mechanisms 1050, 1052, 1054, 1056, 1058 and 1059. The torque-transmitting mechanisms 1050, 1052, 1054 and 1056 are of the rotating-type torque-transmitting mechanisms, commonly termed clutches. The torque-transmitting mechanisms 1058 and 1059 are stationary-type torque-transmitting mechanisms, commonly termed brakes or reaction clutches.

The input shaft 17 is continuously connected with the sun gear member 1032, and the output shaft 19 is continuously connected with the ring gear member 1024. The ring gear member 1044 is continuously connected with the transmission housing 1060. The ring gear member 1034 is continuously connected with the sun gear member 1042 through the interconnecting member 1070.

The sun gear member 1022 is selectively connectable with the ring gear member 1034 through the clutch 1050. The planet carrier assembly member 1026 is selectively connectable with the planet carrier assembly member 1036 through the clutch 1052. The planet carrier assembly member 1026 is selectively connectable with the sun gear member 1032 through the clutch 1054. The planet carrier assembly member 1036 is selectively connectable with the planet carrier assembly member 1046 through the clutch 1056. The sun gear member 1022 is selectively connectable with the transmission housing 1060 through the brake 1058. The planet carrier assembly member 1036 is selectively connectable with the transmission housing 1060 through the brake 1059.

The truth table shown in FIG. 11b describes the engagement combinations and the engagement sequence necessary to provide the reverse drive ratio and the seven forward speed ratios. A sample of the numerical values for the ratios is also provided in the truth table of FIG. 11b. These values are determined utilizing the ring gear/sun gear tooth ratios also given in FIG. 11b. The R1/S1 value is the tooth ratio for the planetary gear set 1020; the R2/S2 value is the tooth ratio for the planetary gear set 1030; and the R3/S3 value is the tooth ratio for the planetary gear set 1040. Also given in FIG. 11b is a chart describing the step ratios between the adjacent forward speed ratios and the reverse to first forward speed ratio.

Those skilled in the art will recognize that the numerical values of the reverse, first and seventh forward speed ratios are determined utilizing the ring gear/sun gear tooth ratios of the planetary gear sets 1020, 1030 and 1040. The numerical values of the second, third and sixth forward speed ratios are determined utilizing the ring gear/sun gear tooth ratios of the planetary gear sets 1020 and 1030. The numerical value of the fourth forward speed ratio is 1. The numerical value of the fifth forward speed ratio is determined utilizing the ring gear/sun gear tooth ratio of the planetary gear set 1020.

Figures 12A, 12B:
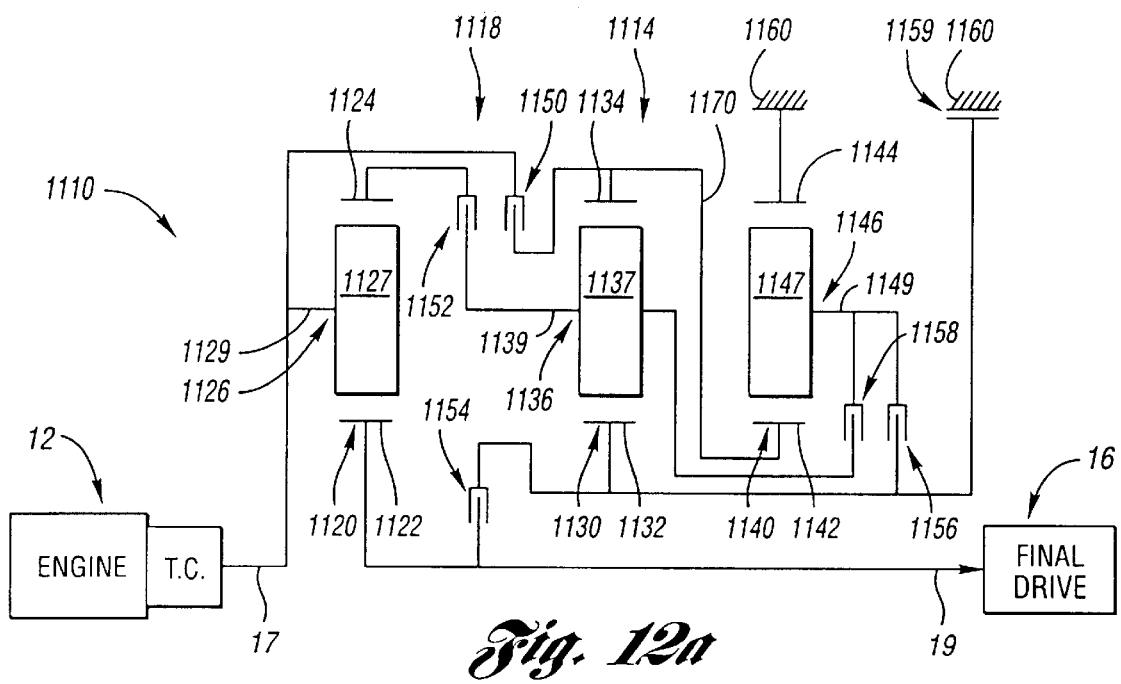

A powertrain 1110, shown in FIG. 12a, has a conventional engine and torque converter 12, a planetary transmission 1114, and the conventional final drive mechanism 16. The planetary transmission 1114 includes a planetary gear arrangement 1118 which is connected with the engine and torque converter 12 through the input shaft 17 and with the final drive mechanism 16 through the output shaft 19. The planetary gear arrangement 1118 includes three planetary gear sets 1120, 1130 and 1140.

The planetary gear set 1120 includes a sun gear member 1122, a ring gear member 1124, and a planet carrier assembly 1126. The planet carrier assembly 1126 includes a plurality of pinion gears 1127 rotatably mounted on a carrier member 1129 and disposed in meshing relationship with both the sun gear member 1122 and the ring gear member 1124.

The planetary gear set 1130 includes a sun gear member 1132, a ring gear member 1134, and a planet carrier assembly member 1136. The planet carrier assembly member 1136 includes a plurality of intermeshing pinion gears 1137 that are rotatably mounted on a carrier member 1139 and disposed in meshing relationship with both the sun gear member 1132 and the ring gear member 1134.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

The planetary gear arrangement 1118 also includes six torque-transmitting mechanisms 1150, 1152, 1154, 1156, 1158 and 1159. The torque-transmitting mechanisms 1150, 1152, 1154, 1156 and 1158 are of the rotating-type torque-transmitting mechanisms, commonly termed clutches. The torque-transmitting mechanism 1159 is a stationary-type torque-transmitting mechanism, commonly termed brake or reaction clutch.

The input shaft 17 is continuously connected with the planet carrier assembly member 1126, and the output shaft 19 is continuously connected with the sun gear member 1122. The ring gear member 1144 is continuously connected with the transmission housing 1160. The ring gear member 1134 is continuously connected with the sun gear member 1142 through the interconnecting member 1170.

The planet carrier assembly member 1126 is selectively connectable with the ring gear member 1134 through the clutch 1150. The ring gear member 1124 is selectively connectable with the planet carrier assembly member 1136 through the clutch 1152. The sun gear member 1122 is selectively connectable with the sun gear member 1132 through the clutch 1154. The sun gear member 1132 is selectively connectable with the planet carrier assembly member 1146 through the clutch 1156. The planet carrier assembly member 1136 is selectively connectable with the planet carrier assembly member 1146 through the clutch 1158. The sun gear member 1132 is selectively connectable with the transmission housing 1160 through the brake 1159.

The truth table shown in FIG. 12b describes the engagement sequence and engagement combinations utilized with the present family member to provide a reverse drive ratio and seven forward speed ratios. The truth table of FIG. 12b also provides a set of example numbers that can be established in the planetary gear arrangement 1118 utilizing the ring gear/sun gear tooth ratios. The R1/S1 value is the ring gear/sun gear tooth ratio of the planetary gear set 1120; the R2/S2 value is the ring gear/sun gear tooth ratio of the planetary gear set 1130; and the R3/S3 value is the ring gear/sun gear tooth ratio of the planetary gear set 1140.

The chart of FIG. 12b describes the ratio steps between adjacent forward speed ratios for a seven-speed transmission. These step ratios are established utilizing the example speed ratios given in the truth table. As also shown in the truth table, the torque-transmitting mechanisms 1150 and 1154 can remain engaged through the neutral condition, thereby simplifying the forward/reverse interchange.

Those skilled in the art will recognize that the numerical value of the reverse speed ratio is determined utilizing the ring gear/sun gear tooth ratios of the planetary gear sets 1130 and 1140. The numerical value of the first forward speed ratio is determined utilizing the ring gear/sun gear tooth ratio of the planetary gear set 1140. The numerical values of the second, fourth and seventh forward speed ratios are determined utilizing the ring gear/sun gear tooth ratios of the planetary gear sets 1120, 1130 and 1140. The numerical value of the third forward speed ratio is 1. The numerical value of the fifth forward speed ratio is determined utilizing the ring gear/sun gear tooth ratios of the planetary gear sets 1120 and 1130. The numerical value of the sixth forward speed ratio is determined utilizing the ring gear/sun gear tooth ratios of the planetary gear sets 1120 and 1140.

Figures 13A, 13B:
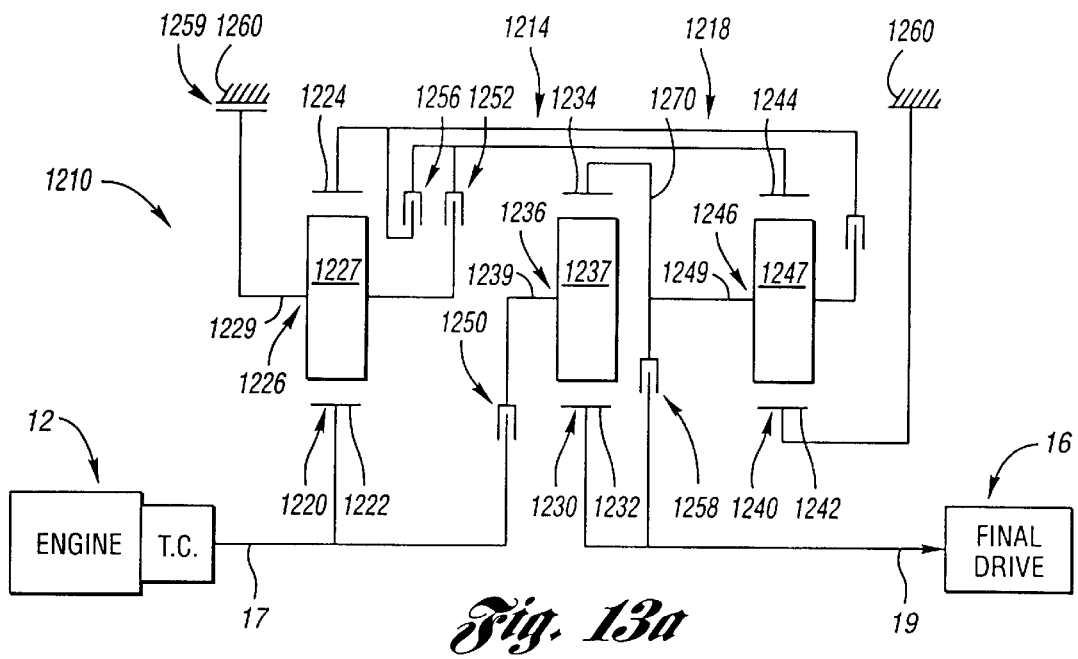

A powertrain 1210, shown in FIG. 13a, includes the conventional engine and torque converter 12, a planetary transmission 1214, and the conventional final drive mechanism 16. The engine and torque converter are drivingly connected with the planetary transmission 1214 through the input shaft 17. The planetary transmission 1214 is drivingly connected with the final drive mechanism 16 through the output shaft 19. The planetary transmission 1214 includes a planetary gear arrangement 1218 that has a first planetary gear set 1220, a second planetary gear set 1230, and a third planetary gear set 1240.

The planetary gear set 1220 includes a sun gear member 1222, a ring gear member 1224, and a planet carrier assembly 1226. The planet carrier assembly 1226 includes a plurality of pinion gears 1227 rotatably mounted on a carrier member 1229 and disposed in meshing relationship with both the sun gear member 1222 and the ring gear member 1224.

The planetary gear set 1230 includes a sun gear member 1232, a ring gear member 1234, and a planet carrier assembly member 1236. The planet carrier assembly member 1236 includes a plurality of pinion gears 1237 rotatably mounted on a carrier member 1239 and disposed in meshing relationship with both the sun gear member 1232 and the ring gear member 1234.

The planetary gear set 1240 includes a sun gear member 1242, a ring gear member 1244, and a planet carrier assembly member 1246. The planet carrier assembly member 1246 includes a plurality of pinion gears 1247 rotatably mounted on a carrier member 1249 and disposed in meshing relationship with both the sun gear member 1242 and the ring gear member 1244.

The planetary gear arrangement 1218 also includes six torque transmitting mechanisms 1250, 1252, 1254, 1256, 1258 and 1259. The torque-transmitting mechanisms 1250, 1252, 1254, 1256 and 1258 are of the rotating-type torque-transmitting mechanisms, commonly termed clutches. The torque-transmitting mechanism 1259 is a stationary-type torque-transmitting mechanism, commonly termed brake or reaction clutch.

The input shaft 17 is continuously connected with the sun gear member 1222, and the output shaft 19 is continuously connected with the sun gear member 1232. The sun gear member 1242 is continuously connected with the transmission housing 1260. The ring gear member 1234 is continuously connected with the planet carrier assembly member 1246 through the interconnecting member 1270.

The sun gear member 1222 is selectively connectable with the planet carrier assembly member 1236 through the clutch 1250. The planet carrier assembly member 1226 is selectively connectable with the ring gear member 1244 through the clutch 1252. The ring gear member 1224 is selectively connectable with the planet carrier assembly member 1246 through the clutch 1254. The ring gear member 1224 is selectively connectable with the ring gear member 1244 through the clutch 1256. The planet carrier assembly member 1246 is selectively connectable with the sun gear member 1232 through the clutch 1258. The planet carrier assembly member 1226 is selectively connectable with the transmission housing 1260 through the brake 1259.

The truth table shown in FIG. 13b describes the engagement combinations and the engagement sequence necessary to provide the reverse drive ratio and eight forward speed ratios. A sample of the numerical values for the ratios is also provided in the truth table of FIG. 13b. These values are determined utilizing the ring gear/sun gear tooth ratios also given in FIG. 13b. The R1/S1 value is the tooth ratio for the planetary gear set 1220; the R2/S2 value is the tooth ratio for the planetary gear set 1230; and the R3/S3 value is the tooth ratio for the planetary gear set 1240. Also given in FIG. 13b is a chart describing the step ratios between the adjacent forward speed ratios and the reverse to first forward speed ratio.

Those skilled in the art will recognize that the numerical values of the reverse and first forward speed ratios are determined utilizing the ring gear/sun gear tooth ratios of the planetary gear sets 1220 and 1240. The numerical value of the second forward speed ratio is determined utilizing the ring gear/sun gear tooth ratio of the planetary gear set 1240. The numerical value of the third forward speed ratio is 1. The numerical value of the fourth forward speed ratio is determined utilizing the ring gear/sun gear tooth ratios of the planetary gear sets 1230 and 1240. The numerical values of the fifth and seventh forward speed ratios are determined utilizing the ring gear/sun gear tooth ratio of the planetary gear sets 1220, 1230 and 1240. The numerical value of the sixth forward speed ratio is determined utilizing the ring gear/sun gear tooth ratio of the planetary gear set 1230. The numerical value of the eighth forward speed ratio is determined utilizing the ring gear/sun gear tooth ratios of the planetary gear sets 1220 and 1230.

Figures 14A, 14B:
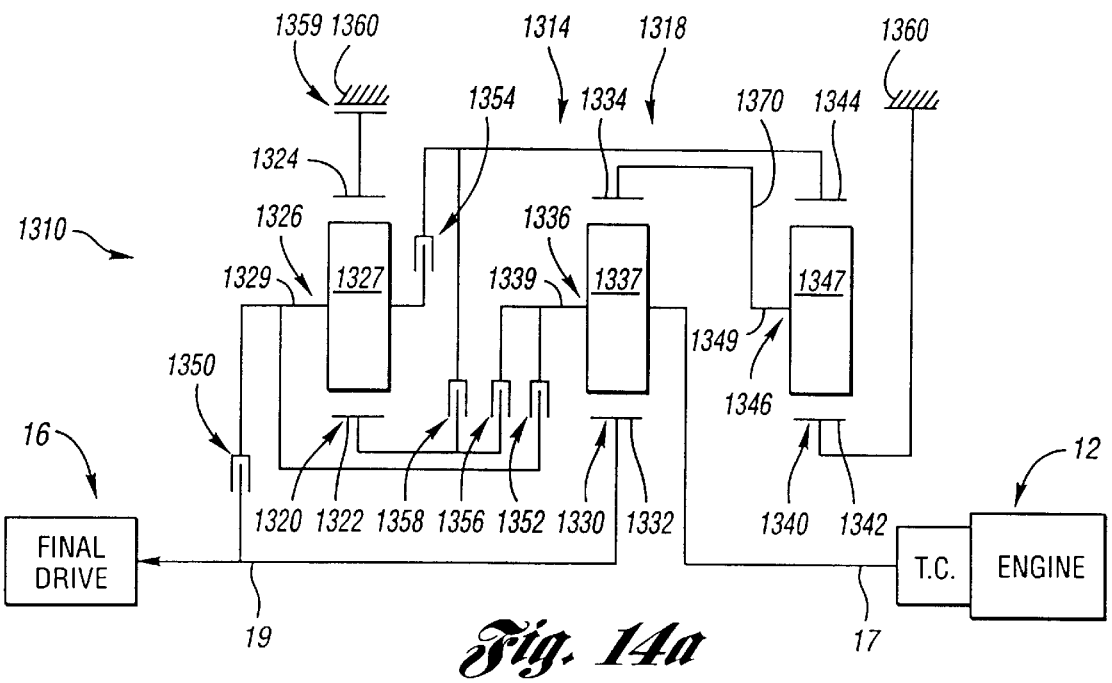

A powertrain 1310, shown in FIG. 14a, includes the conventional engine and torque converter 12, a planetary transmission 1314, and the conventional final drive mechanism 16. The engine and torque converter are drivingly connected with the planetary transmission 1314 through the input shaft 17. The planetary transmission 1314 is drivingly connected with the final drive mechanism 16 through the output shaft 19. The planetary transmission 1314 includes a planetary gear arrangement 1318 that has a first planetary gear set 1320, a second planetary gear set 1330, and a third planetary gear set 1340.

The planetary gear set 1320 includes a sun gear member 1322, a ring gear member 1324, and a planet carrier assembly 1326. The planet carrier assembly 1326 includes a plurality of pinion gears 1327 rotatably mounted on a carrier member 1329 and disposed in meshing relationship with both the sun gear member 1322 and the ring gear member 1324.

The planetary gear set 1330 includes a sun gear member 1332, a ring gear member 1334, and a planet carrier assembly member 1336. The planet carrier assembly member 1336 includes a plurality of pinion gears 1337 rotatably mounted on a carrier member 1339 and disposed in meshing relationship with both the sun gear member 1332 and the ring gear member 1334.

The planetary gear set 1340 includes a sun gear member 1342, a ring gear member 1344, and a planet carrier assembly member 1346. The planet carrier assembly member 1346 includes a plurality of pinion gears 1347 rotatably mounted on a carrier member 1349 and disposed in meshing relationship with both the sun gear member 1342 and the ring gear member 1344.

The planetary gear arrangement 1318 also includes six torque transmitting mechanisms 1350, 1352, 1354, 1356, 1358 and 1359. The torque-transmitting mechanisms 1350, 1352, 1354, 1356 and 1358 are of the rotating-type torque-transmitting mechanisms, commonly termed clutches. The torque-transmitting mechanism 1359 is a stationary-type torque-transmitting mechanism, commonly termed brake or reaction clutch.

The input shaft 17 is continuously connected with the planet carrier assembly member 1336, and the output shaft 19 is continuously connected with the sun gear member 1332. The sun gear member 1342 is continuously connected with the transmission housing 1360. The ring gear member 1334 is continuously connected with the planet carrier assembly member 1346 through the interconnecting member 1370.

The planet carrier assembly member 1326 is selectively connectable with the sun gear member 1332 through the clutch 1350. The planet carrier assembly member 1326 is selectively connectable with the planet carrier assembly member 1336 through the clutch 1352. The planet carrier assembly member 1326 is selectively connectable with the ring gear member 1344 through the clutch 1354. The sun gear member 1322 is selectively connectable with the planet carrier assembly member 1336 through the clutch 1356. The sun gear member 1322 is selectively connectable with the ring gear member 1344 through the clutch 1358. The ring gear member 1324 is selectively connectable with the transmission housing 1360 through the brake 1359.

The truth table shown in FIG. 14b describes the engagement combinations and the engagement sequence necessary to provide the reverse drive ratio and the seven forward speed ratios. A sample of the numerical values for the ratios is also provided in the truth table of FIG. 14b. These values are determined utilizing the ring gear/sun gear tooth ratios also given in FIG. 14b. The R1/S1 value is the tooth ratio for the planetary gear set 1320; the R2/S2 value is the tooth ratio for the planetary gear set 1330; and the R3/S3 value is the tooth ratio for the planetary gear set 1340. Also given in FIG. 14b is a chart describing the step ratios between the adjacent forward speed ratios and the reverse to first forward speed ratio.

Those skilled in the art will recognize that the numerical values of the reverse, second and sixth forward speed ratios are determined utilizing the ring gear/sun gear tooth ratios of the planetary gear sets 1320, 1330 and 1340. The numerical value of the first forward speed ratio is determined utilizing the ring gear/sun gear tooth ratio of the planetary gear set 1320. The numerical value of the third forward speed ratio is 1. The numerical values of the fourth and fifth forward speed ratios are determined utilizing the ring gear/sun gear tooth ratios of the planetary gear sets 1330 and 1340. The numerical value of the seventh forward speed ratio is determined utilizing the ring gear/sun gear tooth ratio of the planetary gear set 1330.

Figures 15A, 15B:
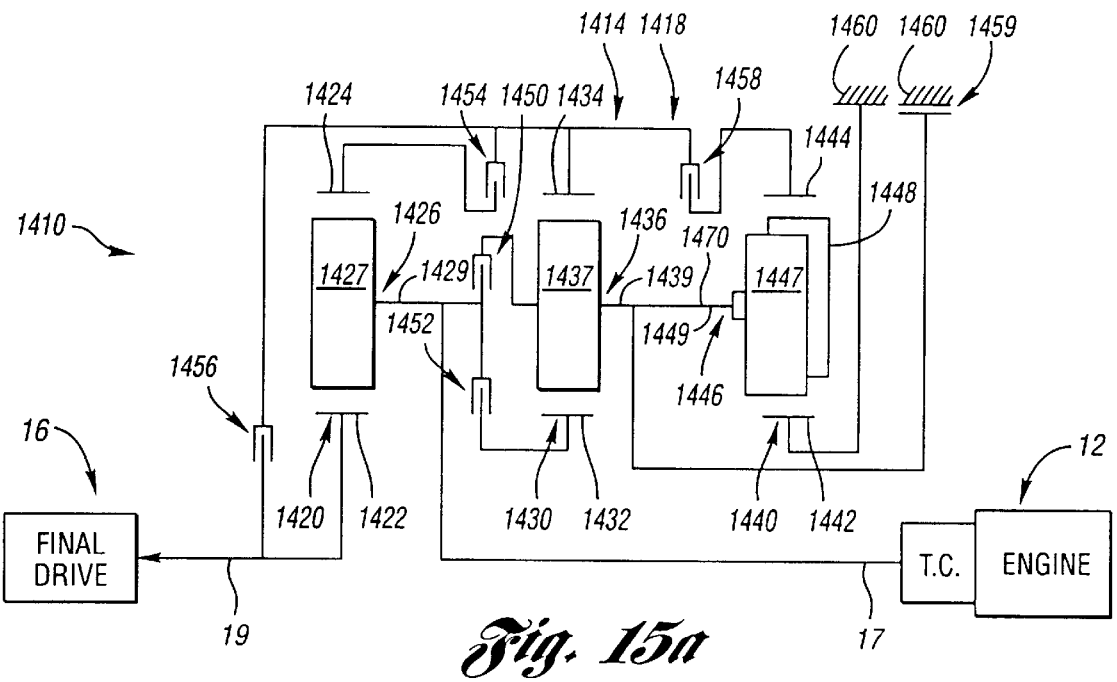

A powertrain 1410, shown in FIG. 15a, includes the conventional engine and torque converter 12, a planetary transmission 1414, and the conventional final drive mechanism 16. The engine and torque converter are drivingly connected with the planetary transmission 1414 through the input shaft 17. The planetary transmission 1414 is drivingly connected with the final drive mechanism 16 through the output shaft 19. The planetary transmission 1414 includes a planetary gear arrangement 1418 that has a first planetary gear set 1420, a second planetary gear set 1430, and a third planetary gear set 1440.

The planetary gear set 1420 includes a sun gear member 1422, a ring gear member 1424, and a planet carrier assembly 1426. The planet carrier assembly 1426 includes a plurality of pinion gears 1427 rotatably mounted on a carrier member 1429 and disposed in meshing relationship with both the sun gear member 1422 and the ring gear member 1424.

The planetary gear set 1430 includes a sun gear member 1432, a ring gear member 1434, and a planet carrier assembly member 1436. The planet carrier assembly member 1436 includes a plurality of pinion gears 1437 rotatably mounted on a carrier member 1439 and disposed in meshing relationship with both the sun gear member 1432 and the ring gear member 1434.

The planetary gear set 1440 includes a sun gear member 1442, a ring gear member 1444, and a planet carrier assembly member 1446. The planet carrier assembly member 1446 includes a plurality of pinion gears 1447 and 1448 rotatably mounted on a carrier member 1449 and disposed in meshing relationship with both the sun gear member 1442 and the ring gear member 1444.

The planetary gear arrangement 1418 also includes six torque fit transmitting mechanisms 1450, 1452, 1454, 1456, 1458 and 1459. The torque-transmitting mechanisms 1450, 1452, 1454, 1456 and 1458 are of the rotating-type torque-transmitting mechanisms, commonly termed clutches. The torque-transmitting mechanism 1459 is a stationary-type torque-transmitting mechanism, commonly termed brake or reaction clutch.

The input shaft 17 is continuously connected with the planet carrier assembly member 1426, and the output shaft 19 is continuously connected with the sun gear member 1422. The sun gear member 1442 is continuously connected with the transmission housing 1460. The planet carrier assembly member 1436 is continuously connected with the planet carrier assembly member 1446 through the interconnecting member 1470.

The planet carrier assembly member 1426 is selectively connectable with the planet carrier assembly member 1436 through the clutch 1450. The planet carrier assembly member 1426 is selectively connectable with the sun gear member 1432 through the clutch 1452. The ring gear member 1424 is selectively connectable with the ring gear member 1434 through the clutch 1454. The sun gear member 1422 is selectively connectable with the ring gear member 1434 through the clutch 1456. The ring gear member 1434 is selectively connectable with the ring gear member 1444 through the clutch 1458. The planet carrier assembly member 1446 is selectively connectable with the transmission housing 1460 through the brake 1459.

The truth table shown in FIG. 15b describes the engagement combinations and the engagement sequence necessary to provide the reverse drive ratio and the seven forward speed ratios. A sample of the numerical values for the ratios is also provided in the truth table of FIG. 15b. These values are determined utilizing the ring gear/sun gear tooth ratios also given in FIG. 15b. The R1/S1 value is the tooth ratio for the planetary gear set 1420; the R2/S2 value is the tooth ratio for the planetary gear set 1430; and the R3/S3 value is the tooth ratio for the planetary gear set 1440. Also given in FIG. 15b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1430. The numerical value of the first forward speed ratio is determined utilizing the ring gear/sun gear tooth ratios of the planetary gear sets 1430 and 1440. The numerical value of the second forward speed ratio is determined utilizing the ring gear/sun gear tooth ratio of the planetary gear set 1440. The numerical value of the third forward speed ratio is 1. The numerical value of the fourth forward speed ratio is determined utilizing the ring gear/sun gear tooth ratios of the planetary gear sets 1420 and 1440. The numerical value of the fifth forward speed ratio is determined utilizing the ring gear/sun gear tooth ratios of the planetary gear sets 1420, 1430 and 1440. The numerical value of the sixth forward speed ratio is determined utilizing the ring gear/sun gear tooth ratio of the planetary gear set 1420. The numerical value of the seventh forward speed ratio is determined utilizing the ring gear/sun gear tooth ratios of the planetary gear sets 1420 and 1430.

Figures 16A, 16B:
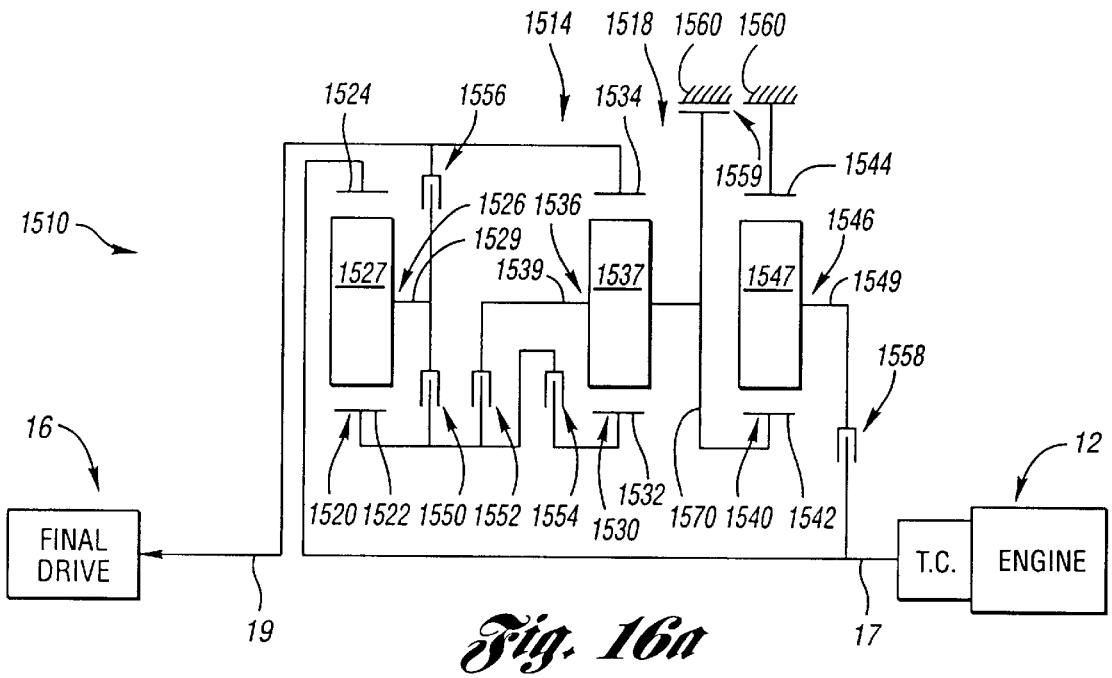

A powertrain 1510, shown in FIG. 16a, includes the conventional engine and torque converter 12, a planetary transmission 1514, and the conventional final drive mechanism 16. The engine and torque converter are drivingly connected with the planetary transmission 1514 through the input shaft 17. The planetary transmission 1514 is drivingly connected with the final drive mechanism 16 through the output shaft 19. The planetary transmission 1514 includes a planetary gear arrangement 1518 that has a first planetary gear set 1520, a second planetary gear set 1530, and a third planetary gear set 1540.

The planetary gear set 1520 includes a sun gear member 1522, a ring gear member 1524, and a planet carrier assembly 1526. The planet carrier assembly 1526 includes a plurality of pinion gears 1527 rotatably mounted on a carrier member 1529 and disposed in meshing relationship with both the sun gear member 1522 and the ring gear member 1524.

The planetary gear set 1530 includes a sun gear member 1532, a ring gear member 1534, and a planet carrier assembly member 1536. The planet carrier assembly member 1536 includes a plurality of pinion gears 1537 rotatably mounted on a carrier member 1539 and disposed in meshing relationship with both the sun gear member 1532 and the ring gear member 1534.

The planetary gear set 1540 includes a sun gear member 1542, a ring gear member 1544, and a planet carrier assembly member 1546. The planet carrier assembly member 1546 includes a plurality of pinion gears 1547 rotatably mounted on a carrier member 1549 and disposed in meshing relationship with both the sun gear member 1542 and the ring gear member 1544.

The planetary gear arrangement 1518 also includes six torque transmitting mechanisms 1550, 1552, 1554, 1556, 1558 and 1559. The torque-transmitting mechanisms 1550, 1552, 1554, 1556 and 1558 are of the rotating-type torque-transmitting mechanisms, commonly termed clutches. The torque-transmitting mechanism 1559 is a stationary-type torque-transmitting mechanism, commonly termed brake or reaction clutch.

The input shaft 17 is continuously connected with the ring gear member 1524, and the output shaft 19 is continuously connected with the ring gear member 1534. The ring gear member 1544 is continuously connected with the transmission housing 1560. The planet carrier assembly member 1536 is continuously connected with the sun gear member 1542 through the interconnecting member 1570.

The sun gear member 1522 is selectively connectable with the planet carrier assembly member 1526 through the clutch 1550. The sun gear member 1522 is selectively connectable with the planet carrier assembly member 1536 through the clutch 1552. The sun gear member 1522 is selectively connectable with the sun gear member 1532 through the clutch 1554. The planet carrier assembly member 1526 is selectively connectable with the ring gear member 1534 through the clutch 1556. The ring gear member 1524 is selectively connectable with the planet carrier assembly member 1546 through the clutch 1558. The planet carrier assembly member 1536 is selectively connectable with the transmission housing 1560 through the brake 1559.

The truth table shown in FIG. 16b describes the engagement combinations and the engagement sequence necessary to provide the reverse drive ratio and the seven forward speed ratios. A sample of the numerical values for the ratios is also provided in the truth table of FIG. 16b. These values are determined utilizing the ring gear/sun gear tooth ratios also given in FIG. 16b. The R1/S1 value is the tooth ratio for the planetary gear set 1520; the R2/S2 value is the tooth ratio for the planetary gear set 1530; and the R3/S3 value is the tooth ratio for the planetary gear set 1540. Also given in FIG. 16b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1530. The numerical value of the first forward speed ratio is determined utilizing the ring gear/sun gear tooth ratios of the planetary gear sets 1520 and 1530. The numerical value of the second forward speed ratio is determined utilizing the ring gear/sun gear tooth ratio of the planetary gear set 1520. The numerical value of the third forward speed ratio is 1. The numerical value of the fourth forward speed ratio is determined utilizing the ring gear/sun gear tooth ratios of the planetary gear sets 1520 and 1540. The numerical value of the fifth forward speed ratio is determined utilizing the ring gear/sun gear tooth ratios of the planetary gear sets 1520, 1530 and 1540. The numerical value of the sixth forward speed ratio is determined utilizing the ring gear/sun gear tooth ratio of the planetary gear set 1540. The numerical value of the seventh forward speed ratio is determined utilizing the ring gear/sun gear tooth ratios of the planetary gear sets 1530 and 1540.

Figures 17A, 17B:
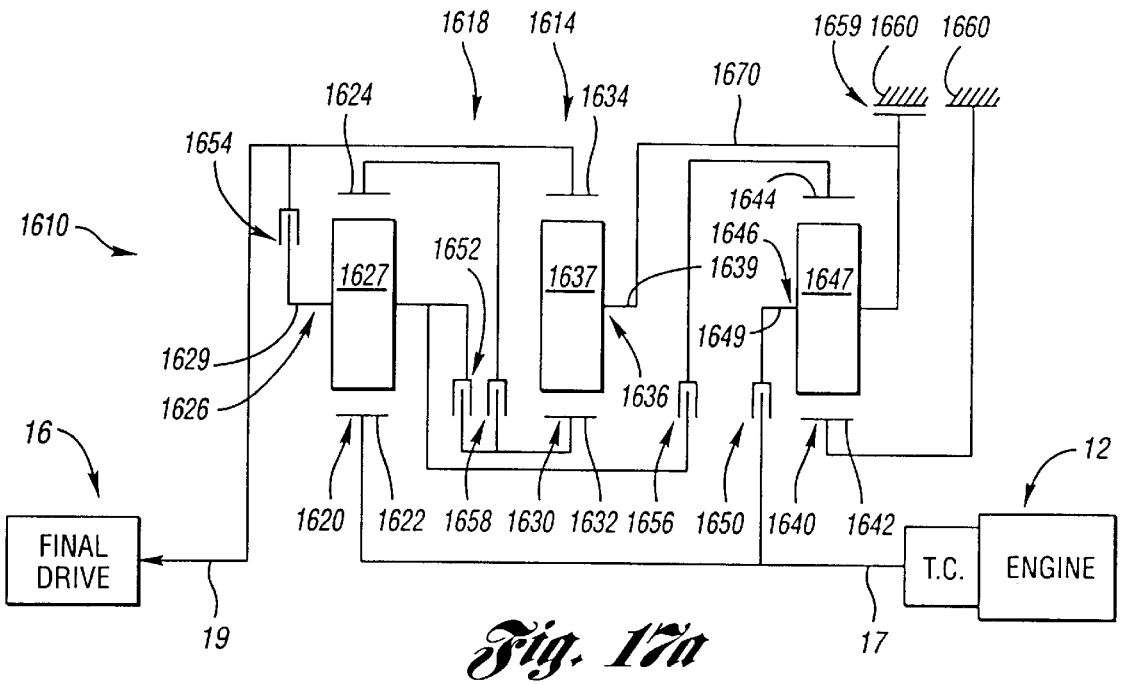

A powertrain 1610, shown in FIG. 17a, includes the conventional engine and torque converter 12, a planetary transmission 1614, and the conventional final drive mechanism 16. The engine and torque converter are drivingly connected with the planetary transmission 1614 through the input shaft 17. The planetary transmission 1614 is drivingly connected with the final drive mechanism 16 through the output shaft 19. The planetary transmission 1614 includes a planetary gear arrangement 1618 that has a first planetary gear set 1620, a second planetary gear set 1630, and a third planetary gear set 1640.

The planetary gear set 1620 includes a sun gear member 1622, a ring gear member 1624, and a planet carrier assembly 1626. The planet carrier assembly 1626 includes a plurality of pinion gears 1627 rotatably mounted on a carrier member 1629 and disposed in meshing relationship with both the sun gear member 1622 and the ring gear member 1624.

The planetary gear set 1630 includes a sun gear member 1632, a ring gear member 1634, and a planet carrier assembly member 1636. The planet carrier assembly member 1636 includes a plurality of pinion gears 1637 rotatably mounted on a carrier member 1639 and disposed in meshing relationship with both the sun gear member 1632 and the ring gear member 1634.

The planetary gear set 1640 includes a sun gear member 1642, a ring gear member 1644, and a planet carrier assembly member 1646. The planet carrier assembly member 1646 includes a plurality of pinion gears 1647 rotatably mounted on a carrier member 1649 and disposed in meshing relationship with both the sun gear member 1642 and the ring gear member 1644.

The planetary gear arrangement 1618 also includes six torque transmitting mechanisms 1650, 1652, 1654, 1656, 1658 and 1659. The torque-transmitting mechanisms 1650, 1652, 1654, 1656 and 1658 are of the rotating-type torque-transmitting mechanisms, commonly termed clutches. The torque-transmitting mechanism 1659 is a stationary-type torque-transmitting mechanism, commonly termed brake or reaction clutch.

The input shaft 17 is continuously connected with the sun gear member 1622, and the output shaft 19 is continuously connected with the ring gear member 1634. The sun gear member 1642 is continuously connected with the transmission housing 1660. The planet carrier assembly member 1636 is continuously connected with the planet carrier assembly member 1646 through the interconnecting member 1670.

The sun gear member 1622 is selectively connectable with the planet carrier assembly member 1646 through the clutch 1650. The planet carrier assembly member 1626 is selectively connectable with the sun gear member 1632 through the clutch 1652. The planet carrier assembly member 1626 is selectively connectable with the ring gear member 1634 through the clutch 1654. The planet carrier assembly member 1626 is selectively connectable with the ring gear member 1644 through the clutch 1656. The ring gear member 1624 is selectively connectable with the sun gear member 1632 through the clutch 1658. The planet carrier assembly member 1646 is selectively connectable with the transmission housing 1660 through the brake 1659.

The truth table shown in FIG. 17b describes the engagement combinations and the engagement sequence necessary to provide the reverse drive ratio and the seven forward speed ratios. A sample of the numerical values for the ratios is also provided in the truth table of FIG. 17b. These values are determined utilizing the ring gear/sun gear tooth ratios also given in FIG. 17b. The R1/S1 value is the tooth ratio for the planetary gear set 1620; the R2/S2 value is the tooth ratio for the planetary gear set 1630; and the R3/S3 value is the tooth ratio for the planetary gear set 1640. Also given in FIG. 17b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1630. The numerical values of the first and second forward speed ratios are determined utilizing the ring gear/sun gear tooth ratios of the planetary gear sets 1620 and 1630. The numerical values of the third and fifth forward speed ratios are determined utilizing the ring gear/sun gear tooth ratios of the planetary gear sets 1620, 1630 and 1640. The numerical values of the fourth and sixth forward speed ratios are determined utilizing the ring gear/sun gear tooth ratios of the planetary gear sets 1630 and 1640. The numerical value of the seventh forward speed ratio is 1. The numerical value of the eighth forward speed ratio is determined utilizing the ring gear/sun gear tooth ratio of the planetary gear set 1640.

Figures 18A, 18B:
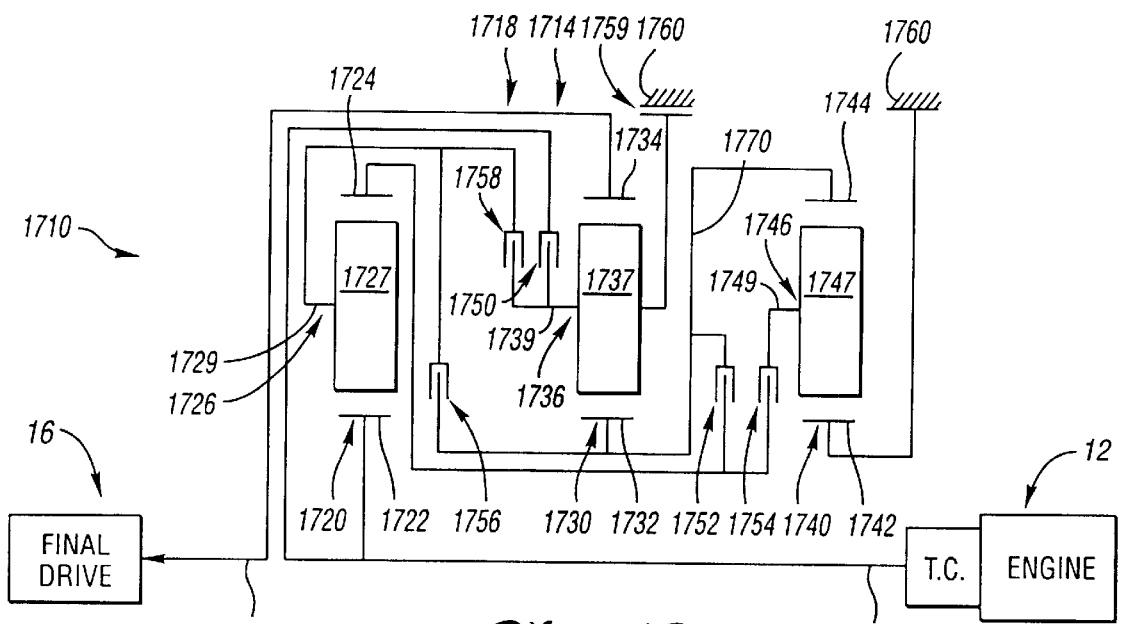

A powertrain 1710, shown in FIG. 18a, includes the conventional engine and torque converter 12, a planetary transmission 1714, and the conventional final drive mechanism 16. The engine and torque converter are drivingly connected with the planetary transmission 1714 through the input shaft 17. The planetary transmission 1714 is drivingly connected with the final drive mechanism 16 through the output shaft 19. The planetary transmission 1714 includes a planetary gear arrangement 1718 that has a first planetary gear set 1720, a second planetary gear set 1730, and a third planetary gear set 1740.

The planetary gear set 1720 includes a sun gear member 1722, a ring gear member 1724, and a planet carrier assembly 1726. The planet carrier assembly 1726 includes a plurality of pinion gears 1727 rotatably mounted on a carrier member 1729 and disposed in meshing relationship with both the sun gear member 1722 and the ring gear member 1724.

The planetary gear set 1730 includes a sun gear member 1732, a ring gear member 1734, and a planet carrier assembly member 1736. The planet carrier assembly member 1736 includes a plurality of pinion gears 1737 rotatably mounted on a carrier member 1739 and disposed in meshing relationship with both the sun gear member 1732 and the ring gear member 1734.

The planetary gear set 1740 includes a sun gear member 1742, a ring gear member 1744, and a planet carrier assembly member 1746. The planet carrier assembly member 1746 includes a plurality of pinion gears 1747 rotatably mounted on a carrier member 1749 and disposed in meshing relationship with both the sun gear member 1742 and the ring gear member 1744.

The planetary gear arrangement 1718 also includes six torque transmitting mechanisms 1750, 1752, 1754, 1756, 1758 and 1759. The torque-transmitting mechanisms 1750, 1752, 1754, 1756 and 1758 are of the rotating-type torque-transmitting mechanisms, commonly termed clutches. The torque-transmitting mechanism 1759 is a stationary-type torque-transmitting mechanism, commonly termed brake or reaction clutch.

The input shaft 17 is continuously connected with the sun gear member 1722, and the output shaft 19 is continuously connected with the ring gear member 1734. The sun gear member 1742 is continuously connected with the transmission housing 1760. The sun gear member 1732 is continuously connected with the ring gear member 1744 through the interconnecting member 1770.

The sun gear member 1722 is selectively connectable with the planet carrier assembly member 1736 through the clutch 1750. The ring gear member 1724 is selectively connectable with the ring gear member 1744 through the clutch 1752. The ring gear member 1724 is selectively connectable with the planet carrier assembly member 1746 through the clutch 1754. The planet carrier assembly member 1726 is selectively connectable with the sun gear member 1732 through the clutch 1756. The planet carrier assembly member 1726 is selectively connectable with the planet carrier assembly member 1736 through the clutch 1758. The planet carrier assembly member 1736 is selectively connectable with the transmission housing 1760 through the brake 1759.

The truth table shown in FIG. 18b describes the engagement combinations and the engagement sequence necessary to provide the reverse drive ratio and the eight forward speed ratios. A sample of the numerical values for the ratios is also provided in the truth table of FIG. 18b. These values are determined utilizing the ring gear/sun gear tooth ratios also given in FIG. 18b. The R1/S1 value is the tooth ratio for the planetary gear set 1720; the R2/S2 value is the tooth ratio for the planetary gear set 1730; and the R3/S3 value is the tooth ratio for the planetary gear set 1740. Also given in FIG. 18b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1730.

The numerical value of the first forward speed ratio is determined utilizing the ring gear/sun gear tooth ratios of the planetary gear sets 1720 and 1730. The numerical values of the second, third, seventh and eighth forward speed ratios are determined utilizing the ring gear/sun gear tooth ratios of the planetary gear sets 1720, 1730 and 1740. The numerical value of the fourth forward speed ratio is determined utilizing the ring gear/sun gear tooth ratios of the planetary gear sets 1720 and 1740. The numerical value of the fifth forward speed ratio is determined utilizing the ring gear/sun gear tooth ratios of the planetary gear sets 1730 and 1740. The numerical value of the sixth forward speed ratio is 1.

Figures 19A, 19B:
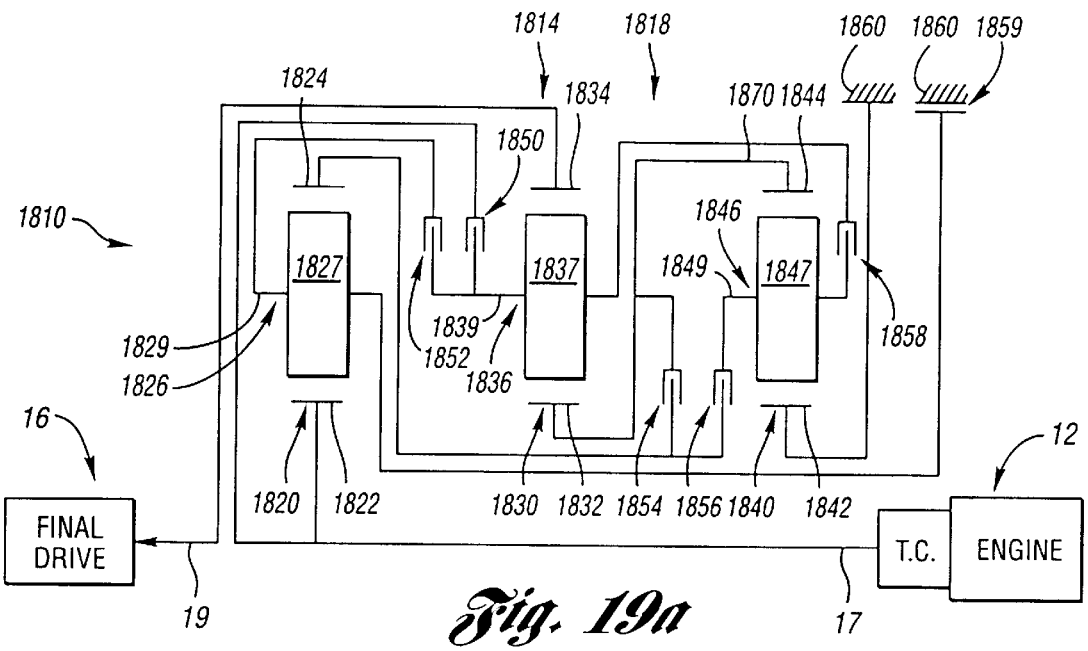

A powertrain 1810, shown in FIG. 19*a*, includes the conventional engine and torque converter 12, a planetary transmission 1814, and the conventional final drive mechanism 16. The engine and torque converter are drivingly connected with the planetary transmission 1814 through the input shaft 17. The planetary transmission 1814 is drivingly connected with the final drive mechanism 16 through the output shaft 19. The planetary transmission 1814 includes a planetary gear arrangement 1818 that has a first planetary gear set 1820, a second planetary gear set 1830, and a third planetary gear set 1840.

The planetary gear set 1820 includes a sun gear member 1822, a ring gear member 1824, and a planet carrier assembly 1826. The planet carrier assembly 1826 includes a plurality of pinion gears 1827 rotatably mounted on a carrier member 1829 and disposed in meshing relationship with both the sun gear member 1822 and the ring gear member 1824.

The planetary gear set 1830 includes a sun gear member 1832, a ring gear member 1834, and a planet carrier assembly member 1836. The planet carrier assembly member 1836 includes a plurality of pinion gears 1837 rotatably mounted on a carrier member 1839 and disposed in meshing relationship with both the sun gear member 1832 and the ring gear member 1834.

The planetary gear set 1840 includes a sun gear member 1842, a ring gear member 1844, and a planet carrier assembly member 1846. The planet carrier assembly member 1846 includes a plurality of pinion gears 1847 rotatably mounted on a carrier member 1849 and disposed in meshing relationship with both the sun gear member 1842 and the ring gear member 1844.

The planetary gear arrangement 1818 also includes six torque transmitting mechanisms 1850, 1852, 1854, 1856, 1858 and 1859. The torque-transmitting mechanisms 1850, 1852, 1854, 1856 and 1858 are of the rotating-type torque-transmitting mechanisms, commonly termed clutches. The torque-transmitting mechanism 1859 is a stationary-type torque-transmitting mechanism, commonly termed brake or reaction clutch.

The input shaft 17 is continuously connected with the sun gear member 1822, and the output shaft 19 is continuously connected with the ring gear member 1834. The sun gear member 1842 is continuously connected with the transmission housing 1860. The sun gear member 1832 is continuously connected with the ring gear member 1844 through the interconnecting member 1870.

The sun gear member 1822 is selectively connectable with the planet carrier assembly member 1836 through the clutch 1850. The planet carrier assembly member 1826 is selectively connectable with the planet carrier assembly member 1836 through the clutch 1852. The ring gear member 1824 is selectively connectable with the sun gear member 1832 through the clutch 1854. The ring gear member 1824 is selectively connectable with the planet carrier assembly member 1846 through the clutch 1856. The planet carrier assembly member 1836 is selectively connectable with the planet carrier assembly member 1846 through the clutch 1858. The planet carrier assembly member 1826 is selectively connectable with the transmission housing 1860 through the brake 1859.

The truth table shown in FIG. 19*b* describes the engagement combinations and the engagement sequence necessary to provide the reverse drive ratio and the nine forward speed ratios. A sample of the numerical values for the ratios is also provided in the truth table of FIG. 19*b*. These values are determined utilizing the ring gear/sun gear tooth ratios also given in FIG. 19*b*. The R1/S1 value is the tooth ratio for the planetary gear set 1820; the R2/S2 value is the tooth ratio for the planetary gear set 1830; and the R3/S3 value is the tooth ratio for the planetary gear set 1840. Also given in FIG. 19*b* is a chart describing the step ratios between the adjacent forward speed ratios and the reverse to first forward speed ratio.

Those skilled in the art will recognize that the numerical values of the reverse, second, eighth and ninth forward speed ratios are determined utilizing the ring gear/sun gear tooth ratios of the planetary gear sets 1820, 1830 and 1840. The numerical values of the first, third and seventh forward speed ratios are determined utilizing the ring gear/sun gear tooth ratios of the planetary gear sets 1820 and 1830. The numerical value of the fourth forward speed ratio is determined utilizing the ring gear/sun gear tooth ratios of the planetary gear sets 1830 and 1840. The numerical value of the fifth forward speed ratio is 1. The numerical value of the sixth forward speed ratio is determined utilizing the ring gear/sun gear tooth ratio of the planetary gear set 1830.

Figures 20A, 20B:
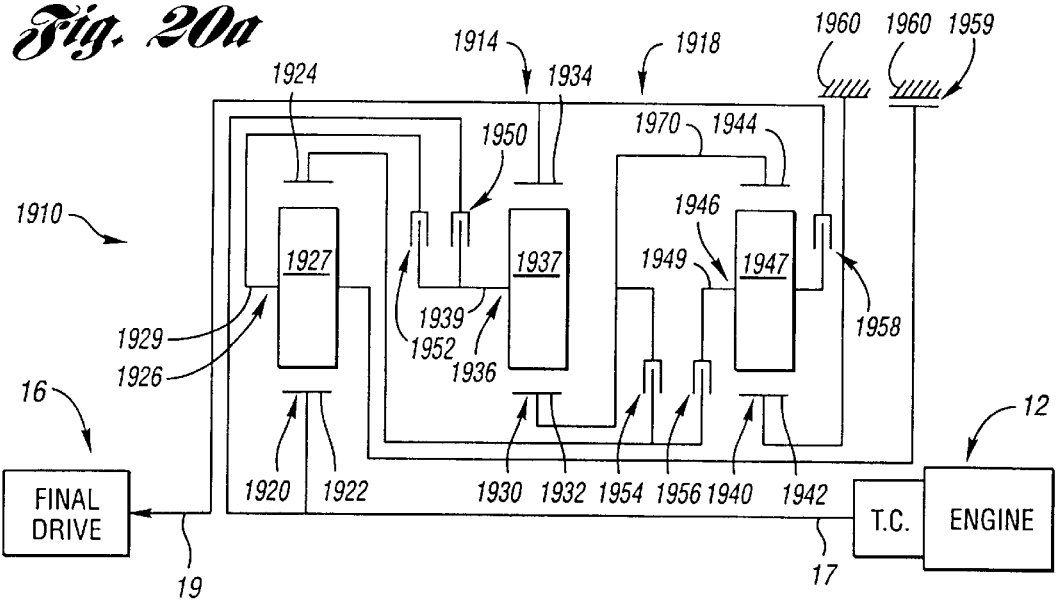

A powertrain 1910, shown in FIG. 20*a*, includes the conventional engine and torque converter 12, a planetary transmission 1914, and the conventional final drive mechanism 16. The engine and torque converter are drivingly connected with the planetary transmission 1914 through the input shaft 17. The planetary transmission 1914 is drivingly connected with the final drive mechanism 16 through the output shaft 19. The planetary transmission 1914 includes a planetary gear arrangement 1918 that has a first planetary gear set 1920, a second planetary gear set 1930, and a third planetary gear set 1940.

The planetary gear set 1920 includes a sun gear member 1922, a ring gear member 1924, and a planet carrier assembly 1926. The planet carrier assembly 1926 includes a plurality of pinion gears 1927 rotatably mounted on a carrier member 1929 and disposed in meshing relationship with both the sun gear member 1922 and the ring gear member 1924.

The planetary gear set 1930 includes a sun gear member 1932, a ring gear member 1934, and a planet carrier assembly member 1936. The planet carrier assembly member 1936 includes a plurality of pinion gears 1937 rotatably mounted on a carrier member 1939 and disposed in meshing relationship with both the sun gear member 1932 and the ring gear member 1934.

The planetary gear set 1940 includes a sun gear member 1942, a ring gear member 1944, and a planet carrier assembly member 1946. The planet carrier assembly member 1946 includes a plurality of pinion gears 1947 rotatably mounted on a carrier member 1949 and disposed in meshing relationship with both the sun gear member 1942 and the ring gear member 1944.

The planetary gear arrangement 1919 also includes six torque transmitting mechanisms 1950, 1952, 1954, 1956,

1958 and 1959. The torque-transmitting mechanisms 1950, 1952, 1954, 1956 and 1958 are of the rotating-type torque-transmitting mechanisms, commonly termed clutches. The torque-transmitting mechanism 1959 is a stationary-type torque-transmitting mechanism, commonly termed brake or reaction clutch.

The input shaft 17 is continuously connected with the sun gear member 1922, and the output shaft 19 is continuously connected with the ring gear member 1934. The sun gear member 1942 is continuously connected with the transmission housing 1960. The sun gear member 1932 is continuously connected with the ring gear member 1944 through the interconnecting member 1970.

The sun gear member 1922 is selectively connectable with the planet carrier assembly member 1936 through the clutch 1950. The planet carrier assembly member 1926 is selectively connectable with the planet carrier assembly member 1936 through the clutch 1952. The ring gear member 1924 is selectively connectable with the sun gear member 1932 through the clutch 1954. The ring gear member 1924 is selectively connectable with the planet carrier assembly member 1946 through the clutch 1956. The ring gear member 1934 is selectively connectable with the planet carrier assembly member 1946 through the clutch 1958. The planet carrier assembly member 1926 is selectively connectable with the transmission housing 1960 through the brake 1959.

The truth table shown in FIG. 20b describes the engagement combinations and the engagement sequence necessary to provide the reverse drive ratio and the ten forward speed ratios. A sample of the numerical values for the ratios is also provided in the truth table of FIG. 20b. These values are determined utilizing the ring gear/sun gear tooth ratios also given in FIG. 20b. The R1/S1 value is the tooth ratio for the planetary gear set 1920; the R2/S2 value is the tooth ratio for the planetary gear set 1930; and the R3/S3 value is the tooth ratio for the planetary gear set 1940. Also given in FIG. 20b is a chart describing the step ratios between the adjacent forward speed ratios and the reverse to first forward speed ratio.

Those skilled in the art will recognize that the numerical value of the reverse speed ratio is determined utilizing the ring gear/sun gear tooth ratio of the planetary gear set 1920. The numerical values of the first, second and ninth forward speed ratios are determined utilizing the ring gear/sun gear tooth ratios of the planetary gear sets 1920 and 1930. The numerical values of the second, fourth and tenth forward speed ratios are determined utilizing the ring gear/sun gear tooth ratios of the planetary gear sets 1920, 1930 and 1940. The numerical values of the fifth and sixth forward speed ratios are determined utilizing the ring gear/sun gear tooth ratios of the planetary gear sets 1930 and 1940. The numerical value of the seventh forward speed ratio is 1. The numerical value of the eighth forward speed ratio is determined utilizing the ring gear/sun gear tooth ratio of the planetary gear set 1930.

While the best modes for carrying out the invention have been described in detail, those familiar with the art to which this invention relates will recognize various alternative designs and embodiments for practicing the invention within the scope of the appended claims.

What is claimed is:

1. A family of transmissions wherein each family member comprises:
   an input shaft;
   an output shaft;
   first, second and third planetary gear sets each having first, second and third members;
   said input shaft being continuously interconnected with a member of said planetary gear sets, and said output shaft being continuously interconnected with another member of said planetary gear sets;
   a first interconnecting member continuously interconnecting said first member of said first planetary gear set and said first member of said second planetary gear set;
   said second member of said first planetary gear set being continuously connected with a transmission housing;
   a first torque-transmitting mechanism selectively interconnecting a member of said first planetary gear set with a member of said second or third planetary gear set;
   a second torque-transmitting mechanism selectively interconnecting a member of said second planetary gear set with a member of said first or third planetary gear set;
   a third torque-transmitting mechanism selectively interconnecting a member of said third planetary gear set with a member of said first or second planetary gear set;
   a fourth torque-transmitting mechanism selectively interconnecting a member of said first or second planetary gear set with another member of said first, second or third planetary gear set;
   a fifth torque-transmitting mechanism selectively interconnecting a member of said first, second or third planetary gear set with another member of said second or third planetary gear set, or with said transmission housing; and
   a sixth torque-transmitting mechanism selectively interconnecting a member of the first, second or third planetary gear set with another member of said first or third planetary gear set, or with said transmission housing;
   said torque-transmitting mechanisms being engaged in combinations of three to establish at least seven forward speed ratios and a reverse speed ratio between said input shaft and said output shaft.

2. The family of transmissions defined in claim 1, wherein said first, second, third, fourth and fifth torque-transmitting mechanisms comprise clutches, and said sixth torque-transmitting mechanism comprises a brake.

3. The family of transmissions defined in claim 1, wherein said first, second, third and fourth torque-transmitting mechanisms comprise clutches, and said fifth and sixth torque-transmitting mechanisms comprise brakes.

4. The family of transmissions defined in claim 1, wherein planet carrier assembly members of each of said planetary gear sets are of the single-pinion type.

5. The family of transmissions defined in claim 1, wherein at least one planet carrier assembly member of said planetary gear sets is of the double-pinion type.

6. A family of transmissions having a plurality of family members wherein each family member comprises:
   an input shaft;
   an output shaft;
   a planetary gear arrangement having first, second and third planetary gear sets, each planetary gear set having first, second and third members;
   said input shaft being continuously interconnected with a member of said planetary gear sets, and said output shaft being continuously interconnected with another member of said planetary gear sets;
   a first interconnecting member continuously interconnecting said first member of said first planetary gear set and said first member of said second planetary gear set;

said second member of said first planetary gear set being continuously connected with a transmission housing; and six torque-transmitting mechanisms for selectively interconnecting said members of said first, second or third planetary gear sets with said transmission housing or with other members of said planetary gear sets, said six torque-transmitting mechanisms being engaged in combinations of three to establish at least seven forward speed ratios and one reverse speed ratio between said input shaft and said output shaft.

7. The family of transmissions defined in claim 6, wherein a first of said six torque-transmitting mechanisms is operable for selectively interconnecting a member of said first planetary gear set with a member of said second or third planetary gear set.

8. The family of transmissions defined in claim 6, wherein a second of said six torque-transmitting mechanisms is operable for selectively interconnecting a member of said second planetary gear set with a member of said first or third planetary gear set.

9. The family of transmissions defined in claim 6, wherein a third of said six torque-transmitting mechanisms is selectively operable for interconnecting a member of said third planetary gear set with a member of said first or second planetary gear set.

10. The family of transmissions defined in claim 6, wherein a fourth of said six torque-transmitting mechanisms is selectively operable for interconnecting a member of said first or second planetary gear set with another member of said first, second or third planetary gear set.

11. The family of transmissions defined in claim 6, wherein a fifth of said six torque-transmitting mechanisms is selectively operable for interconnecting a member of said first, second or third planetary gear set with another member of said second or third planetary gear set, or with said transmission housing.

12. The family of transmissions defined in claim 6, wherein a sixth of said six torque-transmitting mechanisms selectively interconnects a member of said first, second or third planetary gear set with another member of said first or third planetary gear set, or with said transmission housing.

13. The family of transmissions defined in claim 6, wherein a sixth of said six torque-transmitting mechanisms selectively interconnects a member said first, second or third planetary gear set with said transmission housing.

14. The family of transmissions in claim 6, wherein planet carrier assembly members of each of said planetary gear sets are of the single-pinion type.

15. The family of transmissions in claim 6, wherein at least one planet carrier assembly member of said planetary gear sets is of the double-pinion type.

* * * * *